(12) United States Patent
Yasui et al.

(10) Patent No.: US 6,269,585 B1
(45) Date of Patent: *Aug. 7, 2001

(54) INNER ROD FOR A HOLLOW COLLAPSIBLE FISHING ROD

(75) Inventors: Toshihiko Yasui, Tonabayashi; Takafumi Harada, Sakai; Kiyohiko Matsumoto, Sakai; Nobuyoshi Utsuno, Sakai; Norio Hamayasu, Sakai; Isamu Tokuda, Sakai, all of (JP)

(73) Assignee: Shimano Inc., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/337,262

(22) Filed: Jun. 22, 1999

Related U.S. Application Data

(63) Continuation of application No. 08/874,539, filed on Jun. 13, 1997, now Pat. No. 5,946,845, which is a continuation of application No. 08/363,067, filed on Dec. 23, 1994, now abandoned.

(30) Foreign Application Priority Data

Feb. 25, 1994 (JP) ......................................................... 6-27873
Apr. 14, 1994 (JP) ......................................................... 6-75224

(51) Int. Cl.⁷ .................................................... A01K 87/04

(52) U.S. Cl. .................................................................. 43/24

(58) Field of Search ........................................ 43/18.1, 24

(56) References Cited

U.S. PATENT DOCUMENTS

| | | |
|---|---|---|
| 1,595,275 | 8/1926 | White . |
| 3,432,958 | 3/1969 | Bellinger . |
| 3,513,582 | 5/1970 | Carabasse . |
| 4,212,126 | 7/1980 | Barnett . |
| 4,627,188 | 12/1986 | Razote . |
| 5,241,773 * | 9/1993 | Burgh ........................................ 43/24 |
| 5,488,797 | 2/1996 | Akiba . |
| 5,564,214 * | 10/1996 | Tsurufuji ................................... 43/24 |
| 5,575,103 * | 11/1996 | Hare ........................................ 43/24 |
| 5,647,162 * | 7/1997 | Akiba et al. .............................. 43/24 |
| 5,704,157 * | 1/1998 | Utsuno et al. ............................ 43/24 |
| 5,713,151 * | 2/1998 | Matumoto ................................ 43/24 |
| 5,806,230 * | 9/1998 | Yasui ....................................... 43/24 |
| 5,829,182 * | 11/1998 | Okamoto et al. ......................... 43/24 |
| 5,832,653 * | 11/1998 | Tsurufuji ................................. 43/24 |
| 5,926,992 * | 7/1999 | Tsurufuji et al. ......................... 43/24 |
| 5,934,005 * | 8/1999 | Utsuno et al. ............................ 43/24 |
| 5,946,845 * | 9/1999 | Yasui et al. .............................. 43/24 |

FOREIGN PATENT DOCUMENTS

| | | | |
|---|---|---|---|
| 2106455 * | 3/1995 | (CA) | ..................................... 43/18.1 |
| 212882 | 9/1993 | (CN) . | |
| 73.380 | 3/1958 | (FR) . | |

(List continued on next page.)

Primary Examiner—Kurt Rowan
(74) Attorney, Agent, or Firm—Shinjyu Global IP Counselors, LLP

(57) ABSTRACT

A fishing rod includes a tubular rod, an inner rod, and fishline guides. The inner rod has a fishline guiding passage therethrough, and is fitted in or detached from the tubular rod. The fishline guides project toward a center axis in the fishline guiding passage, and are fitted in or detached from the tubular rod. When the inner rod and the fishline guides are attached in the tubular rod, fishline is held by the fishline guides within the tubular rod, and it is drawn out or pulled back through an opening at the tip of the rod. When the inside of the rod is to be cleaned, the inner rod and the fishline guides are taken out of the tubular rod, and they are easily cleaned.

11 Claims, 25 Drawing Sheets

FOREIGN PATENT DOCUMENTS

| | | |
|---|---|---|
| 1.332.647 | 6/1963 | (FR) . |
| 1.574.826 | 7/1969 | (FR) . |
| 2.029.828 | 10/1970 | (FR) . |
| 2 666 721 | 3/1992 | (FR) . |
| 1018878 | 4/1964 | (GB) . |
| 3-67554 | 7/1991 | (JP) . |
| 5-276853 | 10/1993 | (JP) . |
| 1717045 | 3/1992 | (RU) . |

* cited by examiner

FIG.15(A)
FIG.15(B)
FIG.15(C)
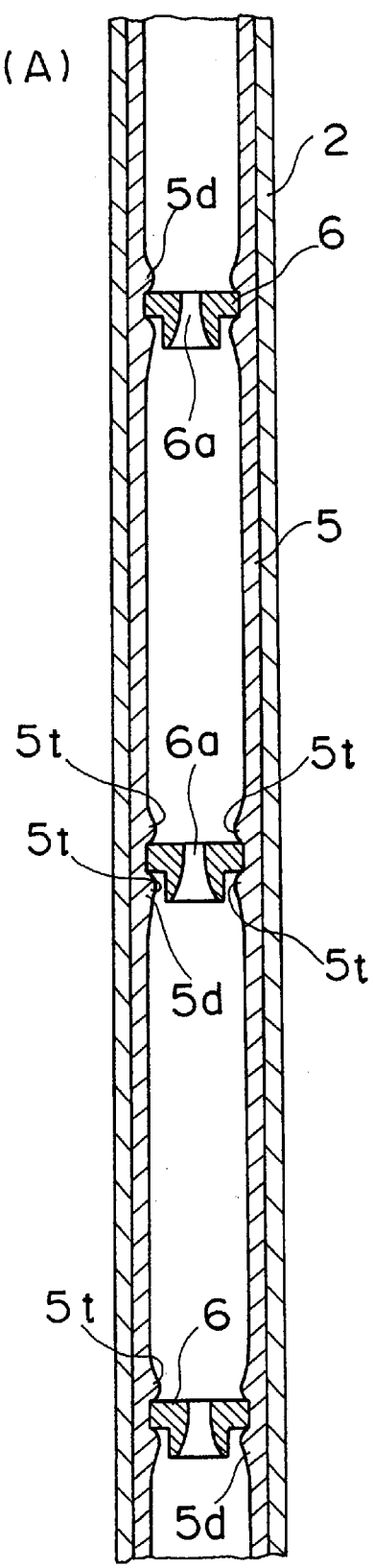
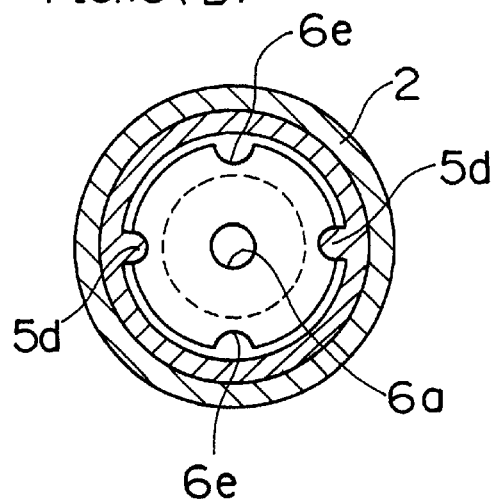
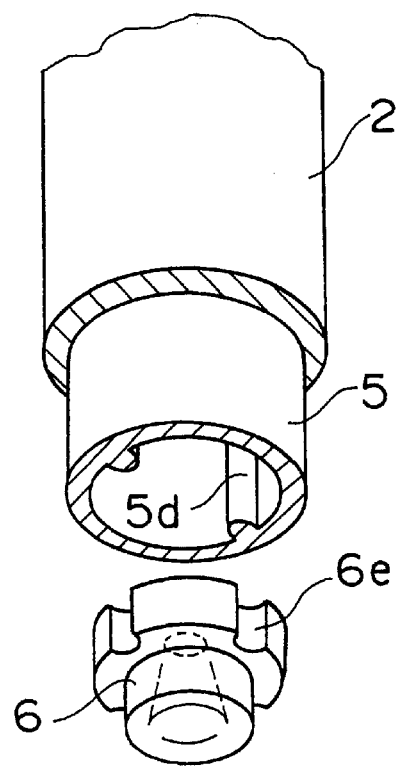

INNER ROD FOR A HOLLOW COLLAPSIBLE FISHING ROD

This application is a continuation of application Ser. No. 08/874,539, filed Jun. 13, 1997, now U.S. Pat. No. 5,946,845, which is a continuation application of application Ser. No. 08/363,067, filed Dec. 23, 1994, now abandoned.

BACKGROUND OF THE INVENTION

The present invention relates to a collapsible fishing rod, and more particularly, it relates to a collapsible fishing rod having an inner rod within it through which a fishing line may extend.

A hollow fishing rod in which a fishline extends through the hollow interior of the rod, are well-known in the art. In a hollow fishing rod, the fishline is unwound and wound up from a reel extends through a passage defined within the rod. As a result, friction resistance is produced as the line contacts the inner surfaces of the hollow fishing rod. As water and other things become trapped or caught in the passage within the rod, the friction resistance is increased, and this results in reduction in speed and efficiency of the unwinding and winding operations of the fishline.

In order to reduce the friction resistance of the sliding fishline, for example, Japanese Unexamined Patent Publication No. 127032/1981, No. 304836/1989, No. 67554/1991, and No. 341133/1992 disclose a fishing rod in which a fishline guide such as a ring or coil for supporting fishline, is fitted into a passage formed the inside the fishing rod. In the above-mentioned prior art, the fishline guide is provided within the rod and since the fishline guide projects inwardly from inner surface of the rod, waterweed, salt in seawater or the like taken on the fishline into the rod tends to deposit in corners and crevices defined by the fishline guide and the inner surface of the rod.

As the accumulation of the undesirable material increases, the fishline comes into contact with the material, and the friction resistance on the sliding fishline is further increased. Thus, in order to make the fishing rod a more effective and useful instrument, the deposits must be occasionally removed. However, it is hard for cleaning equipment to reach the deposits in the corners between the fishline guide and the inner surface of the rod. Removing the deposits can be an annoying task

SUMMARY OF THE INVENTION

Accordingly, it is an object of the present invention to suppress the friction resistance on the sliding fishline and to facilitate removal of dust taken in the rod.

It is still another object of the present invention to provide a fishing rod with a construction which allows for ease of cleaning by providing the fishing rod with a removable inner rod.

It is further another object of the present invention to facilitate drainage of water and other undesirable things which accumulate in the inner rod.

In one aspect of the present invention, a collapsible fishing rod is provided with a tubular rod, an inner rod, and one or more fishline guides. The inner rod has a fishline guiding passage therethrough, and it is removably disposed within the tubular rod. The fishline guides project toward a center axis within the fishline guiding passage, and they are detachable from the tubular rod.

While the inner rod and the fishline guide(s) are fitted in the tubular rod, the fishline is supported by the fishline guides within the tubular rod and is drawn out or pulled back through an opening at the tip of the rod. In cleaning the inside of the rod, the inner rod and the fishline guide(s) are taken out of the rod. Thus, they can be cleaned easily. Preferably, the fishline guides are attached to the inner rod in advance; that is, the fishline guides and the inner rod can be unitarily formed and the fishline guide(s) and inner rod can be easily installed or removed from the rod as a unit.

The fishline guide(s) and the inner rod may be formed in unity. In such a case, similar to the above modification, they can be easily fitted in or detached from the rod. Additionally, fabrication of them is facilitated. The fishline guide(s) may be made of helix coil. In such a case, a simple configuration of the rod is sufficient to support and guide the fishline over a long range within the rod. Preferably, the fishline guide(s) is arranged at given intervals over the entire length of the inner rod. In such a case, the fishline can be supported and guided over the entire length of the inner rod, and the friction resistance on the fishline is reduced.

The inner rod may be divided into sections in an axial direction. The fishline guide or any of the fishline guides is put between the adjacent sections of the inner rod, and herein the fishline guide may be tightly held by the sections of the inner rod fore and after it. In such a case, the fishline guide(s) can be easily positioned in the axial direction, and further, the inner rod and the fishline guide can be easily cleaned.

Preferably, the tubular rod has a butt section with a butt grip and a tip section connectable in joint-to-joint style with a distal end of the butt section, and the inner rod is fitted in or detached from the tip section.

(2) An inter-line fishing rod in another aspect of the present invention has a tubular rod having a fishline guiding passage therethrough, a plurality of fishline guides, and an inner rod. The fishline guides are arranged in the fishline guiding passage almost over the entire length of the tubular rod to support and guide the fishline. The inner rod is put in the fishline guiding passage to hold the fishline guides in position in the axial direction. Herein, since the fishline guides are arranged almost over the entire length of the rod, the friction resistance on the sliding fishline within the rod can be reduced.

The fishline guides may be formed in unity with the inner rod. In such a case, the number of components of the inner rod becomes, smaller, and additionally, incorporation of them into the rod is facilitated. The fishline guides and the inner rod may be made of different materials from each other. In such a case, optimum materials for them may be chosen, respectively. The inner rod is preferably made of thermoplastic resin. In such a case, fabrication of the inner rod is facilitated. The inner rod may have a plurality of tubular units respectively including the fishline guides, and a joint unit connecting the tubular units with each other. In such a case, since the fishline guides can be held by the tubular units, a shape of the joint unit can be simplified, and the configuration of an assembly of those units becomes simple.

The inner rod may have a position regulating element which holds the fishline guides while it release the fishline guides when force over a certain level of regulating capability is applied to the fishline guides. This allows the fishline guides to be easily fitted in the inner rod, and since the fishline guides are movable, the fishline can be easily passed through the fishline guides. Each of the fishline guides preferably has a fishline guide opening formed at axial center and a fishline guide surface spread out backward from the fishline guide opening. In such a case, the fishline can be easily passed through the fishline guides. Moreover, undesirable things such as waterweed taken on the fishline into the rod can be scraped off the fishline at an edge encircling the fishline guide opening. Furthermore, since the fishline is supported by the fishline guide opening, the fishline hardly comes in contact with the inner surface of the rod, and the friction resistance on the sliding fishline is further reduced.

The fishline guides may be formed of helix coil. The fishline guides may include helix coil fishline guides and ring-shaped fishline guides, and the helix coil fishline guides are arranged in a distal half of the inner rod while the ring-shaped fishline guides are arranged in a proximal half of the inner rod. In such a case, since the helix coil is put in the distal half where more water is taken in, drain of the water is facilitated. In addition to that, since the ring-shaped fishline guides support the fishline in the proximal half of the inner rod, the friction resistance on the sliding fishline is reduced.

(3) An inter-line fishing rod in still another aspect of the present invention has a tubular rod having a fishline guiding passage therethrough, a plurality of fishline guides arranged in the fishline guiding passage for supporting fishline, an inner rod put in the fishline guiding passage for holding the fishline guides in position in an axial direction, and inner rod supporters for supporting the inner rod so as to keep the inner rod off inner wall surface of the tubular rod. Herein, since the inner rod is kept away from the inner circumferential wall surface of the rod, bending of the rod no longer cause the rod to come in touch with the inner rod.

The fishline guides may include first fishline guides of helix coil arranged in a fore half of the tubular rod and second fishline guides which are ring shaped and arranged in a rear half of the tubular rod, and the inner rod may include a first tubular inner rod arranged so as to cover outer circumference of the first fishline guides and second tubular inner rod put in the rear half of the rod. This modification is effective on a case where a bend of the fore half of the rod is required. The first inner rod may be made of polyamide resin while the second inner rod may be made of glass fiber resin. The inner rod supporters may include first inner rod supporters supporting the first inner rod and second inner rod supporters supporting the second inner rod. Preferably, a plurality of bores conducting to the outside are formed in the second inner rod. In such a case, the second inner rod, when taken out, can be easily cleaned.

(4) An inter-line fishline rod in further another aspect of the present invention has a main inner rod having a fishline guiding passage in which fishline extends and fitted in or detached from a tubular rod, and fishline guides formed inward in the fishline guiding passage of the main inner rod for supporting the fishline passed through the fishline guiding passage. Herein, cleaning the inner rod is facilitated, and the friction resistance on the sliding fishline can be reduced due to the fishline guides supporting the fishline. These and other objects and advantages of the present invention will be more fully apparent from the detailed description below.

BRIEF DESCRIPTION OF THE DRAWINGS

FIGS. 13–18, 20, 21, and 23–27 include fragmentary sections of a variety of embodiments of inner rods for use with the fishing rod depicted in FIGS. 8, 9A, 9B and 10;

FIG. 34 is on a slightly enlarged scale.

DESCRIPTION OF THE PREFERRED EMBODIMENT

Figure 1A:
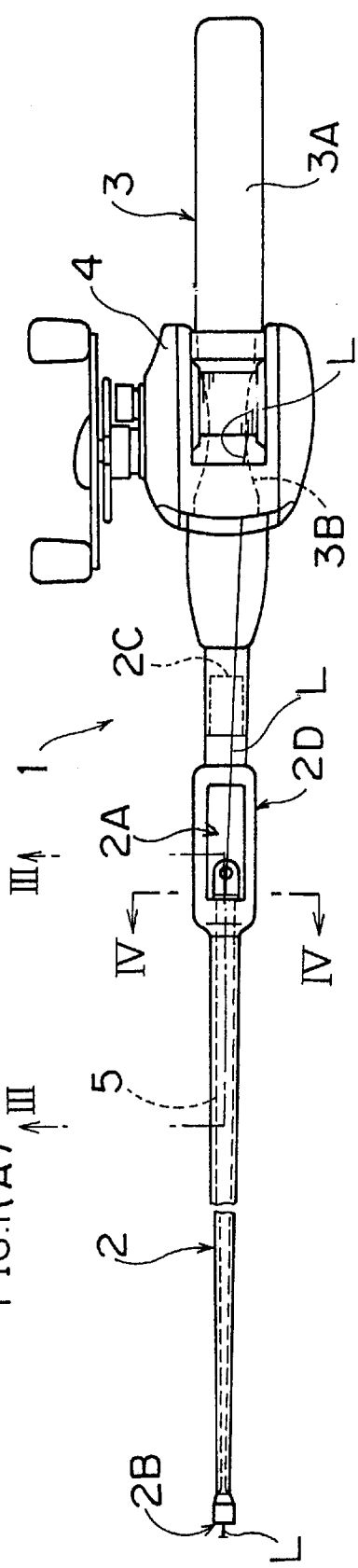
FIG. 1A is a partial section and exploded top elevation showing an outer portion of a fishing rod in accordance with a first embodiment of the present invention.

These and other objects, features, aspects and advantages of the present invention will become more fully apparent from the following detailed description of the present invention when taken in conjunction with the accompanying drawings where like reference numerals denote corresponding parts throughout.

A lure rod 1, in accordance with a first embodiment of the present invention, is shown in FIG. 1. The lure rod 1 has a tip section 2 having an opening 2B at one end and an opening 2C at its other end. The lure rod 1 also includes a butt section 3. The tip section 2 and the butt section 3 are collapsibly connected to each other, where the portion of the tip section 2 adjacent to the opening 2C fits into a corresponding opening in the butt section 3, as is indicated in FIG. 1.

The butt section 3 includes a butt grip 3A and a reel seat 3B formed proximate to it. The tip section 2 has a widened portion 2D, and the widened portion 2D is provided with a fishline guide aperture 2A through which a fishline L drawn from a reel 4 is inserted to the inside of the rod, as will be more clear in the description below.

Within the tip section 2, there is defined a hollow inner space "b" which extends to an opening 2B at its distal end. Through the inner space "b" to the tip section 2, an inner rod 5 is inserted from an opening 2C at a proximal end of the tip section 2. The inner rod 5 is, as shown in FIGS. 1 to 4, a long round tubular element which is gradually tapered along its entire length.

Figure 2:
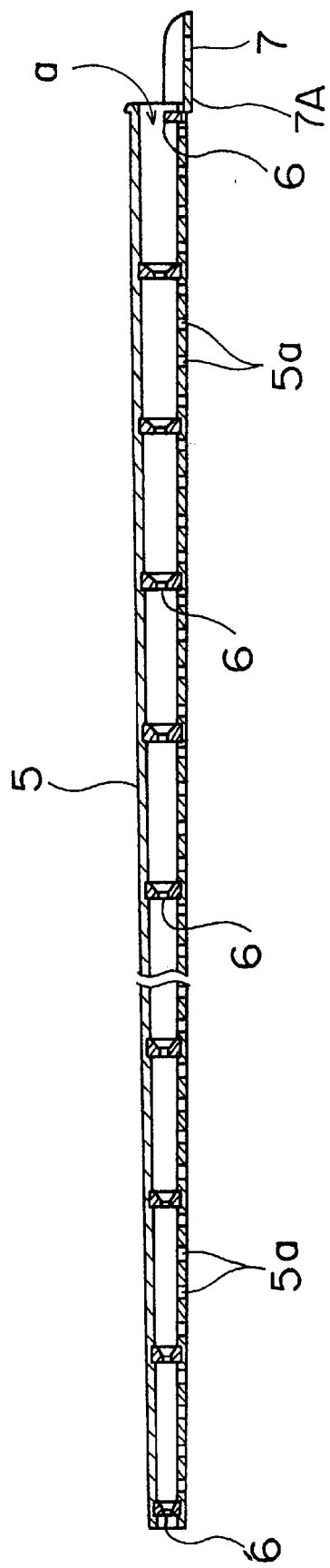
FIG. 2 is a section view of the inner rod portion shown removed from the outer portion of the rod depicted in FIGS. 1A and 1B on a slightly enlarged scale.

Within the inner rod 5, a fishline guiding passage "a" is formed along its elongated length. In the fishline guiding passage "a", as shown in FIG. 2, fishline guides 6 of ceramics are fitted in position over the entire length of the inner rod 5. The fishline guides 6 are disk-shaped elements, in each of which there is formed a fishline guide opening 6a of a small diameter at its center and a fishline guide surface 6b (see FIG. 3) which extends radially outwardly toward the butt section 3 from the fishline guide opening 6a.

The fishline guides 6 may be made from any of a variety of materials, such as metal, ceramics, or fiberglass and resin. With such fishline guides 6, a fishline supported by the fishline guide opening 6a is less likely to come in contact with the inner circumferential surface of the inner rod 5.

Figure 3:
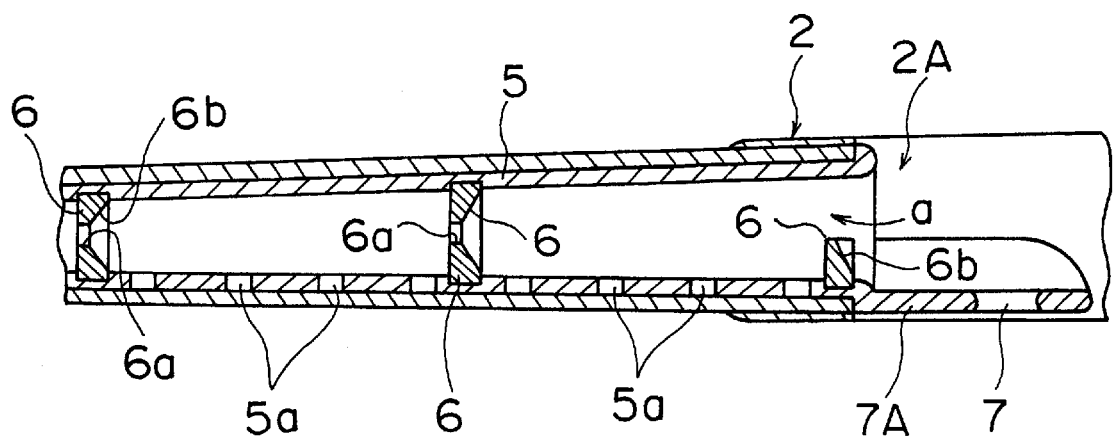
FIG. 3 is a fragmentary section of a portion of the fishing rod taken along the line III—III in FIG. 1A, on a slightly enlarged scale, showing both the inner and outer rod portions.
Figure 4:
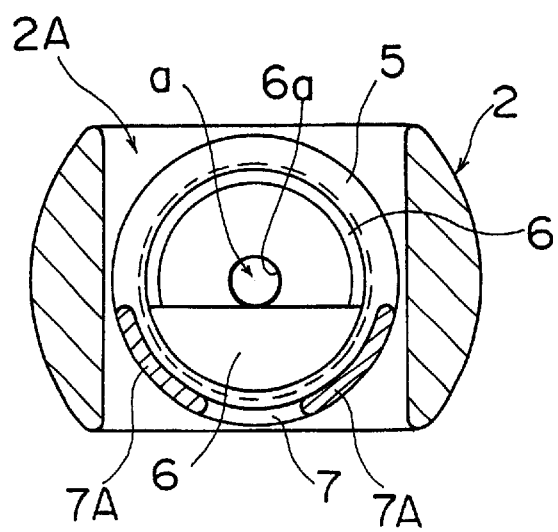
FIG. 4 is a section of the fishing rod taken along the line IV—IV in FIG. 1A, on a slightly enlarged scale.

In the inner rod 5, a plurality of bores 5a are formed extending through its circumferential wall from the passage a, to the outer surface of the inner rod 5. At the butt end of the rod 5, an arcuate flange 7A is formed. A hole 7 is formed in the flange 7A, which extends completely through the flange, as shown in FIGS. 2, 3 and 4.

Figure 1B:
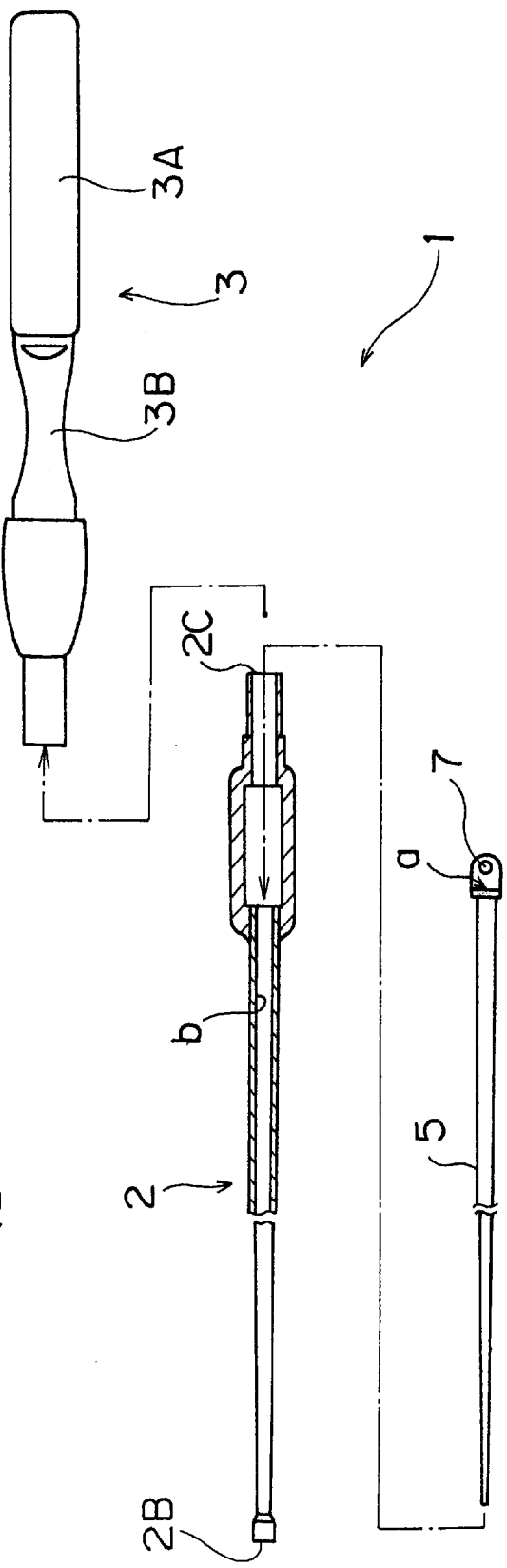
FIG. 1B is a partial section, exploded view of the rod in FIG. 1A with portions of the rod disassembled from one another.

As is indicated in FIG. 1B, the inner rod 5 is disposable inside the bore "b" in the tip section 2 while the rod 1 is used for fishing. During usage, fishline unwound from the reel is guided through the fishline guide aperture 2A into the fishline guiding passage "a" within the inner rod 5.

In the fishline guiding passage "a", the fishline is supported by each of the fishline guide openings 6a of each of the fishline guides 6 and extends out from the opening 2B at the distal end of the tip section 2. Since the fishline is supported by the fishline guides 6 in the inner rod 5, the fishline usually does not touch the inner circumferential wall surface of the inner rod 5.

When the inside of the rod needs to be cleaned, the inner rod 5 may be taken out of the tip section 2. When the inner rod 5 is taken out, dust, dirt and debris that has collected in the inner rod 5 can be removed along with the inner rod 5. In the event that the inner rod 5 is to be washed, the inner rod 5 can be handled easily, in particular since the reel 4 is not attached to the inner rod 5 or the tip section 2. When the inner rod 5 is too dirty to clean, the inner rod 5 can be replaced with new one.

The hole 7 formed in the inner rod 5 serves as a means for removing the inner rod 5 from the tip section 2. For instance, the tip of a small screwdriver or other such instrument might be inserted into the hole 7 and grasped to apply the force necessary to pull the inner rod 5 out of the tip section 2.

Figure 5:
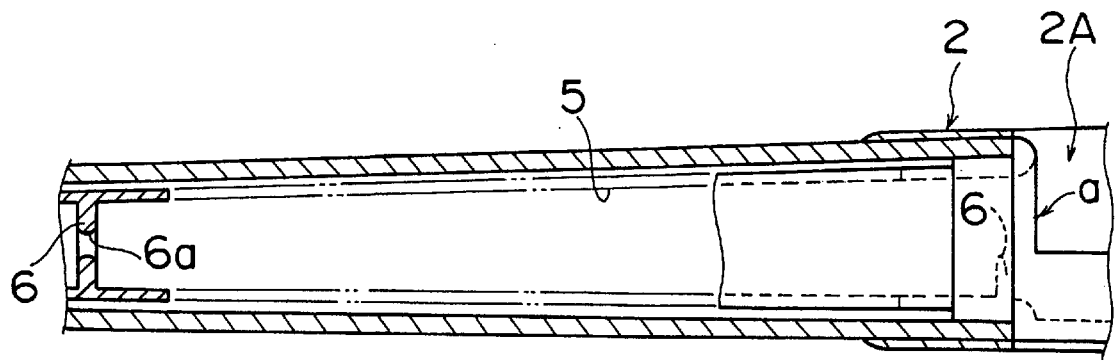
FIGS. 5 through 7 are fragmentary sections, similar to FIG. 2 showing various further embodiments of the inner rod used with the fishing rod depicted in FIG. 1A.
Figure 6:
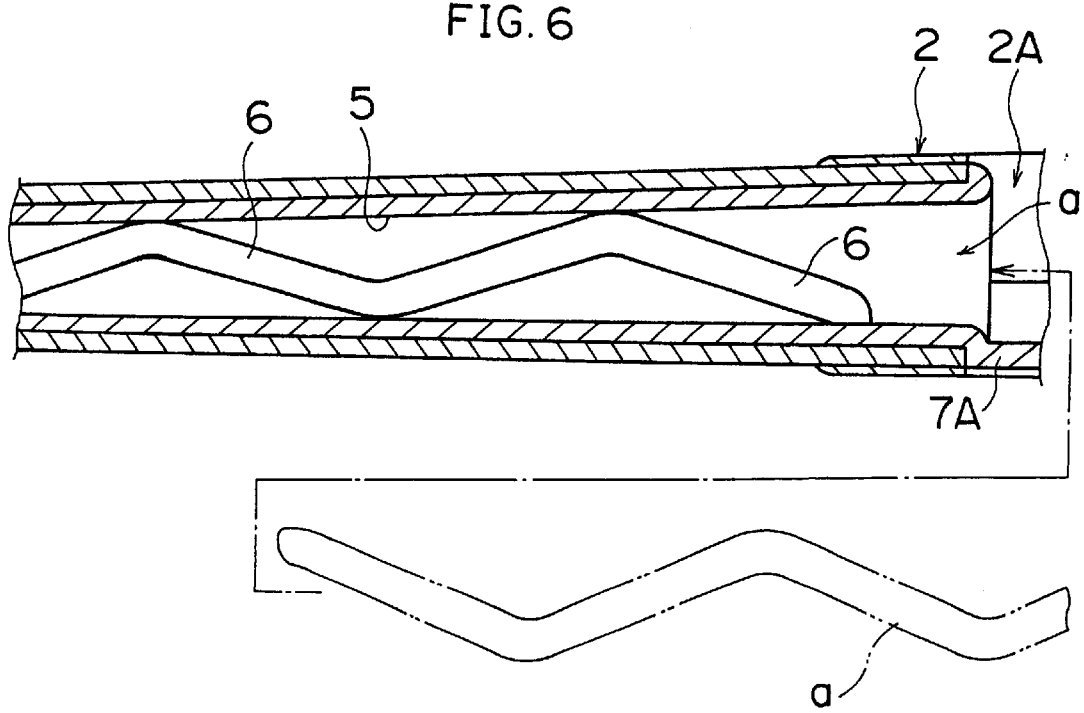

The rod 1, and in particular the inner rod 5, may be modified slightly to provide variations to the first embodiment. For instance, as shown in FIG. 5, the fishline guides 6 may be formed integrally with the inner rod 5. The bores in the inner circumferential wall of the inner rod 5 may be formed elongated in the axial direction of the rod. Further, as shown in FIG. 6, helix coil may be substituted for the fishline guides 6. In such a case, the helix coil may be fitted in the inside of the inner rod 5, or alternatively, elasticity of the coil may be utilized to let it be in biased-contact with the inside of the inner rod 5 so that the coil 6 can be frictionally retained against the inner circumferential surface of the inner rod 5.

Figure 7:
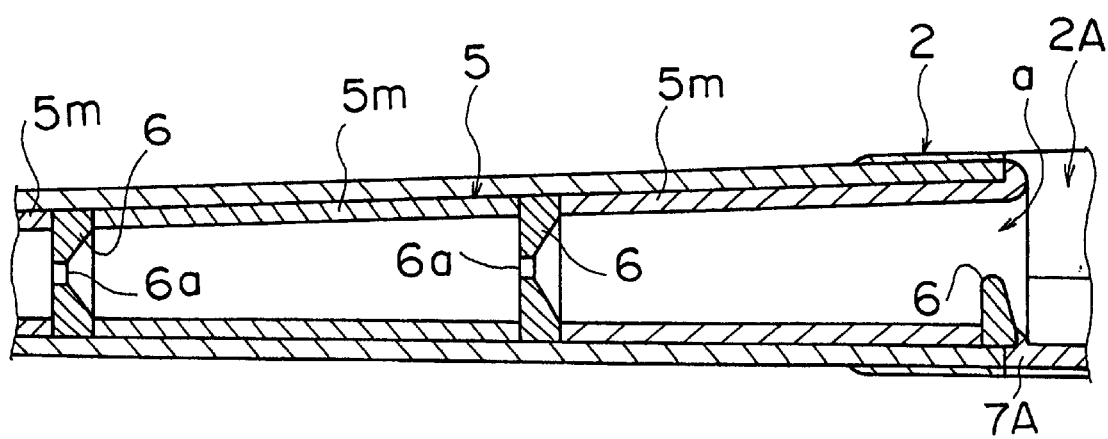

Still further, the fishline guides 6 and the inner rod 5 consisting of inner rod sections 5m may be separately formed and arranged alternately within the tip section 2, as shown in FIG. 7. In such a case, intervals between adjacent ones of the fishline guides 6 can be freely determined by varying a length of the inner rod sections 5m, so that contact between the fishline and the inner surface of the inner rod 5 is minimized. The inner rod sections 5m and the fishline guides 6 being separately formed, allows various fabrication methods to be used.

Figure 8:
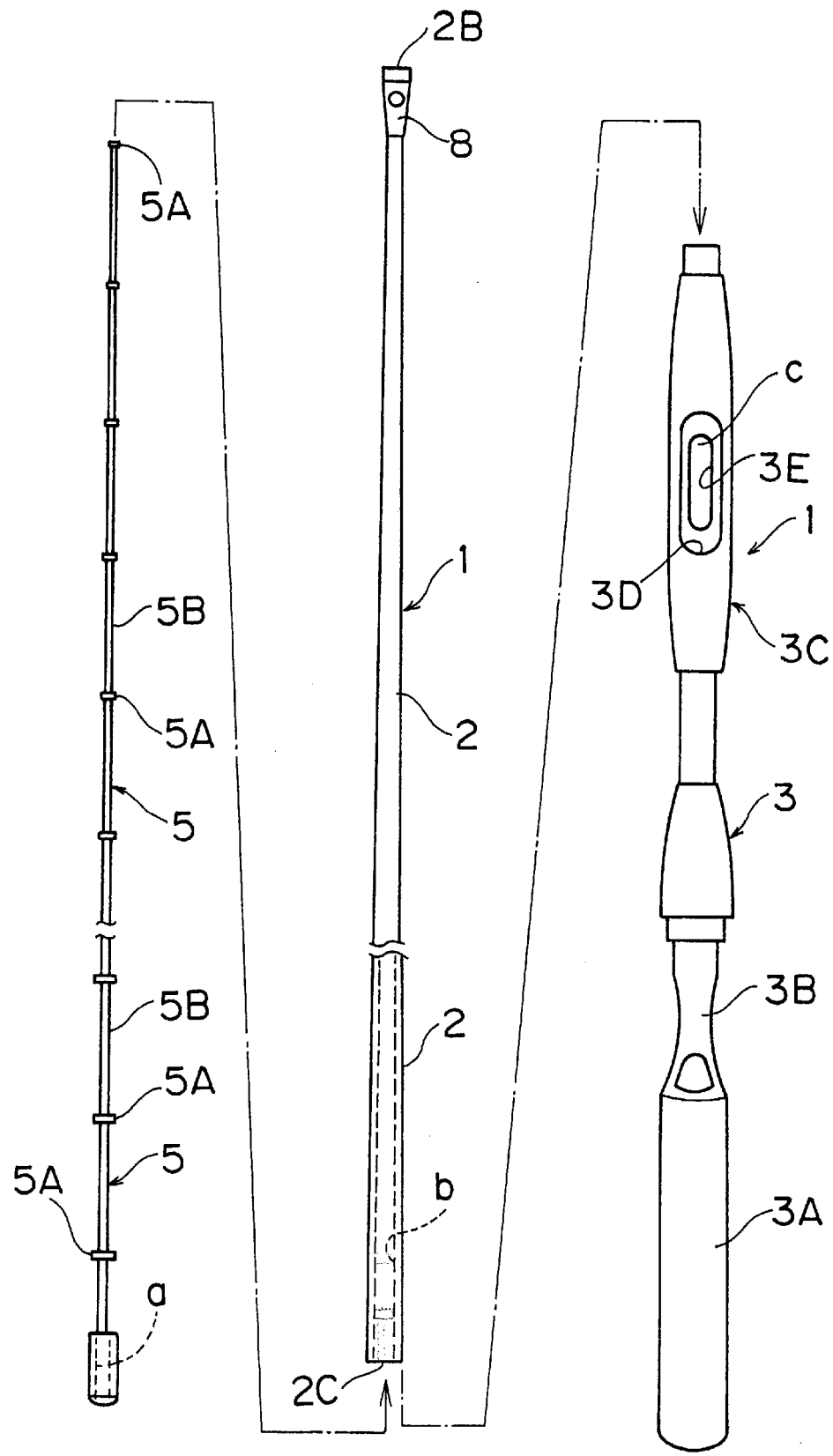
FIG. 8 is an exploded top elevation of another embodiment of the present invention.

Another embodiment of the lure rod 1 is shown in FIGS. 8 and 9. The rod 1 includes a tip section 2 and a butt section 3. The tip section 2 and the butt section 3 are connected in a socket/joint style with each other where in one end of the tip section 2 fits into an opening in the butt section 3, as is shown in FIGS. 8 and 9. The butt section 3 has its distal end provided with a widened portion 3C which serves as a fishline guide sleeve, and in the widened portion 3C, a fishline guide aperture 3D is formed into which fishline from a reel 4 is inserted. Behind the fishline guide aperture 3D, there are provided a reel seat 3B and a butt grip 3A.

The tip section 2 has an inner bore or inner space "b" which extends the length of the tip section 2. The inner space "b" serves as a fishline guiding passage which extends from an opening 2C at a proximal end of the tip section 2 to an opening 2B at its distal end. An inner rod 5 is insertable into the inner space "b".

The fishline guide sleeve 3C can be fitted in or detached from the distal end of the tip section 2 in a socket/joint connection, and it is formed wider than the distal end of the tip section 2. The fishline guide aperture 3D is formed elongated in a longitudinal direction of the rod in the middle of the fishline guide sleeve 3C.

Figure 10:
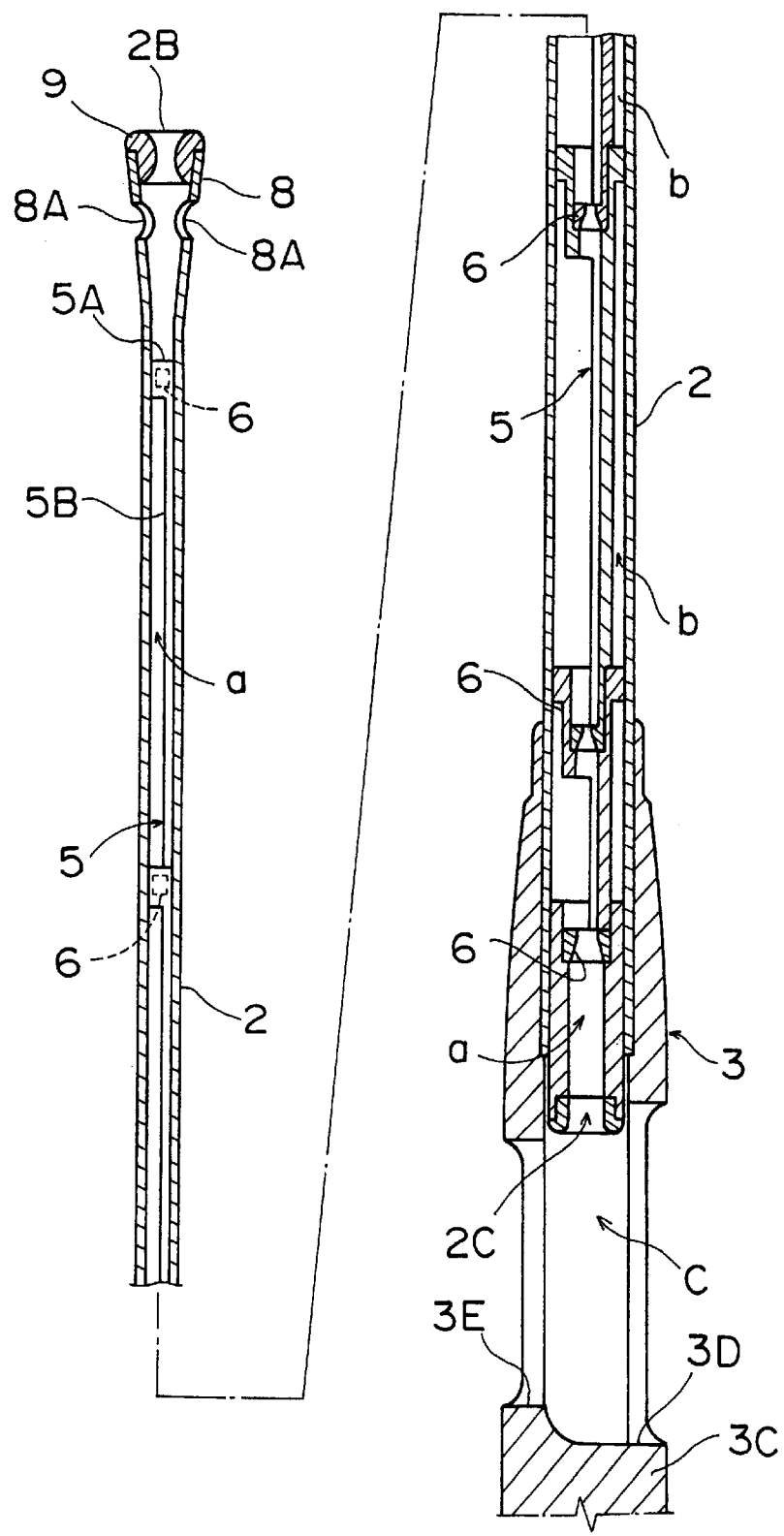
FIG. 10 is a fragmentary, exploded section of a portion of FIG. 9B, on a slightly enlarged scale.

The fishline guide sleeve 3C has a partially hollow interior space C, as shown in FIG. 10. In an assembled state, where the tip section 2 is attached to the butt section 3, the tip section 2 is fitted therein with its proximal end positioned near a fore edge of the fishline guide aperture 3D. Hence, the proximal end of the tip section 2, is visible through the fishline guide aperture 3D.

The interior space C within the fishline guide sleeve 3C between the back edge of the inner space "b" and the fishline guide aperture 3D serves to guide the fishline inserted through the fishline guide aperture 3D into the inner rod 5. As shown in FIG. 10, a bore 3E extending between the inside and outside of the rod is formed approximately corresponding in position to the fishline guide aperture 3D. The bore 3E is shaped in ellipse elongated in the axial direction of the rod, and both longitudinal and lateral lengths are smaller than those of the fishline guide aperture 3D, as is further described in a U.S. patent application Ser. No. 08/368,077 now U.S. Pat, No. 5,528,848, filed on the same day herewith, entitled "Coupling Sleeve For A Fishing Rod."

Figure 11:
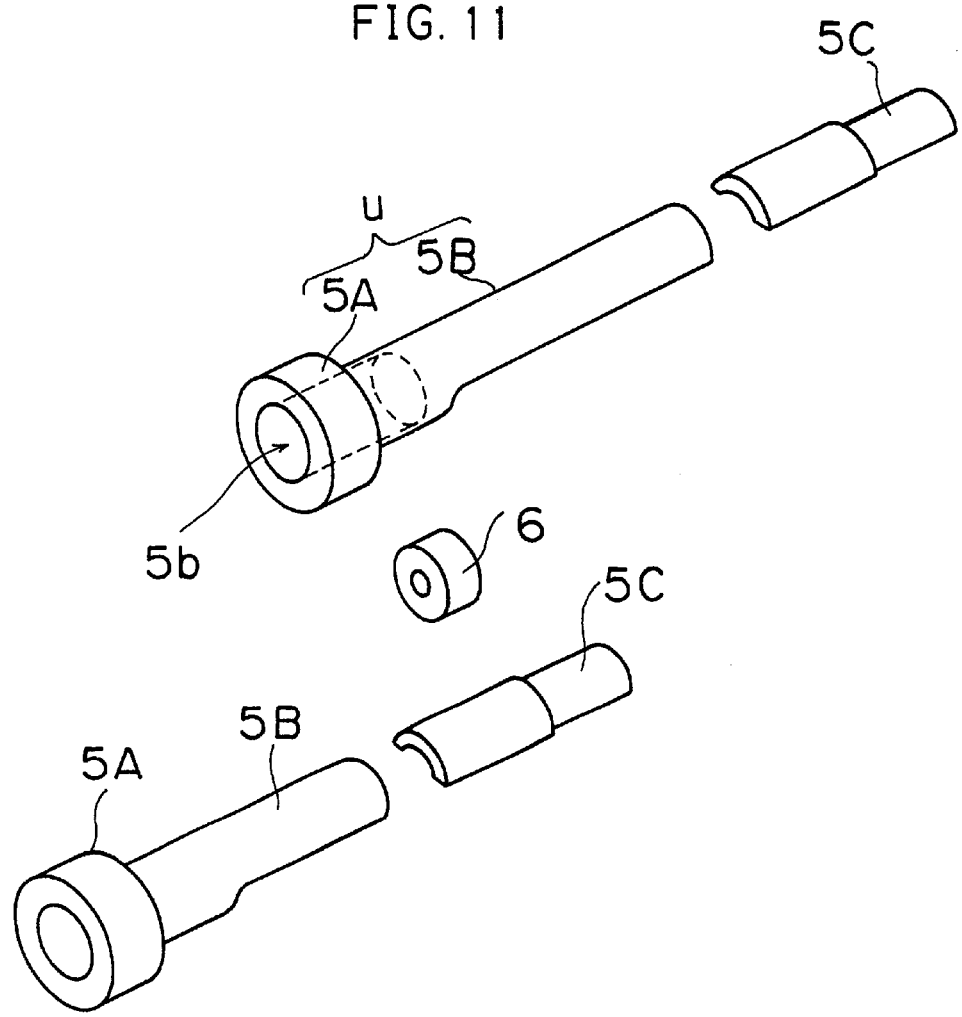
FIG. 11 is a fragmentary, perspective view of the inner rod depicted in FIG. 8.
Figure 12:
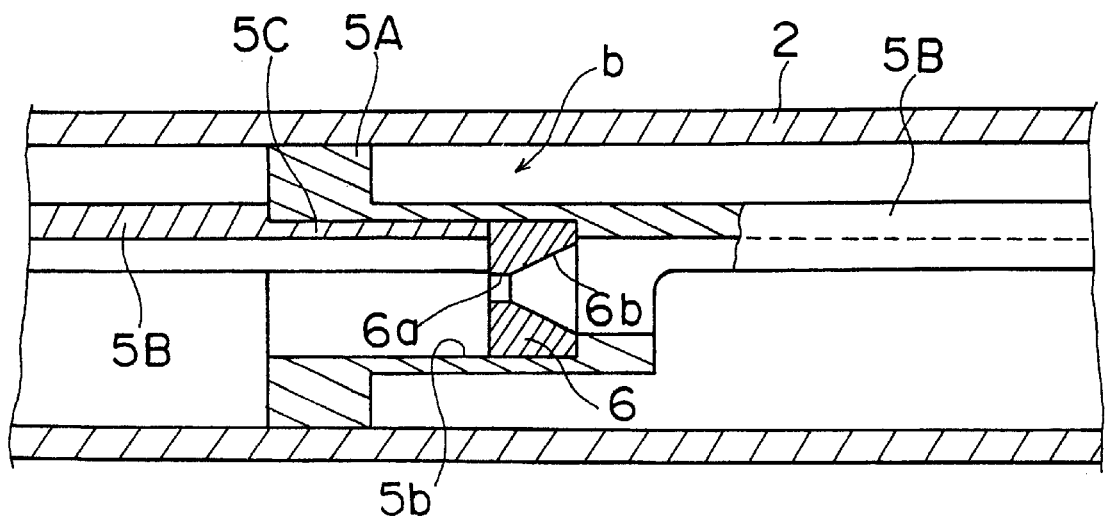
FIG. 12 is a fragmentary, partial section of a portion of FIG. 10, on a slightly enlarged scale, showing the inner rod and outer rod portions.

The inner rod 5, as shown in FIG. 11, includes a plurality of inner rod units u (referred to simply as "units" hereinafter) which are connected to one another, as is described below, such that the inner rod 5 is approximately the same length as the tip section 2. Each unit u includes a tubular portion 5A having a bore 5b. Within each bore 5b, a fishline guide 6 is disposed. Each unit u further includes a joint portion 5B formed integrally with the tubular portion 5A, as shown in FIGS. 11 to 12. In the embodiment depicted, the tubular portion 5A and the joint portion 5B may be formed from metal, plastic or of thermoplastic resin material. The thermoplastic resin material may be polyethylene, polypropylene, nylon and/or ABS which are all highly water-repellent.

The joint portion 5B extends away from the tubular portion 5A. As can be seen in FIG. 11, the joint portion 5B has an arcuate shaped cross-section an extends in a direction generally parallel to the axial center of the bore 5b. Another way of describing the shape of the joint portion 5B is to consider it as having a tubular shape where slightly more than half of the tubular shape has been cut off leaving an elongated arcuate shaped lip. A proximal end 5C of the joint portion 5B also has an arcuate shape, but has a smaller diameter compared to the joint portion 5B. The proximal end 5C is sized to fit within the bore 5b of the tubular portion 5A.

Unlike the rod 1, the inner rod 5 may be made of a flexible material, such as, for instance, rubber. The fishline guide 6 has a ring shape and is formed with an opening 6a. The opening 6a has a small diameter and is centrally formed for guiding a fishline, as shown in FIG. 12. Behind the opening 6a, a fishline guide surface 6b is formed, gradually extending outwardly from the opening 6a. The fishline guide 6 is preferably formed of a rigid material, such as a ceramic and cermet (sintered material), or alternatively, it may be formed of an elastic material such as resin and the like.

When the fishline guide 6 is fixed to the inner rod 5, as shown in FIGS. 10 and 12, the fishline guide 6 is inserted in the through-hole 5b so as to fit in the tubular portion 5A of the inner rod 5. Then, the proximal end 5C of the joint portion 5B is pushed into the through-hole 5b to be in touch with the fishline guide 6, and in such a state where the fishline guide 6 is held in position. The joint portion 5B and the tubular portion 5A are then adhesively fixed to one another. In this way, the units are connected together to form the inner rod 5 while the fishline guide 6 is fitted in position in the inner rod 5, and thus, a fishline guiding passage is defined. Herein the fishline guide 6 can be easily put in a specified position by virtue of the inner rod 5. The fishline guiding passage is formed in a position corresponding to the axis of the joint portion 5B, and this ensures that there lies a sufficient gap between fishline and the inner wall surface of the tip section 2.

In order to fix the units to each other, engagement in various styles and fixation with bolts may be used. As shown in FIG. 10, a top guide 8 is attached to a distal end of the tip section 2. In the top guide 8, a ring 9 for guiding the fishline to the tip of the rod is fitted, and drain hole 8A are formed behind the ring 9. In the rod, dirt and other undesirable things carried by a fishline are caught in the fishline guiding passage defined within the inner rod 5 or are carried to the conducting space C. Materials such as dirt and the like carried by the fishline to the conducting space C are expelled out of the rod through the bore 3E. Thus, dirt and the like which adhere to the fishline wrapped round the reel 4 can be reduced.

Because of eccentrically upward position of the joint portion 5B of the inner rod 5 having an almost crescent cross section and the opening formed in the fishline guide 6, water carried into the rod can drain out through the bore 3E.

Figure 9A:
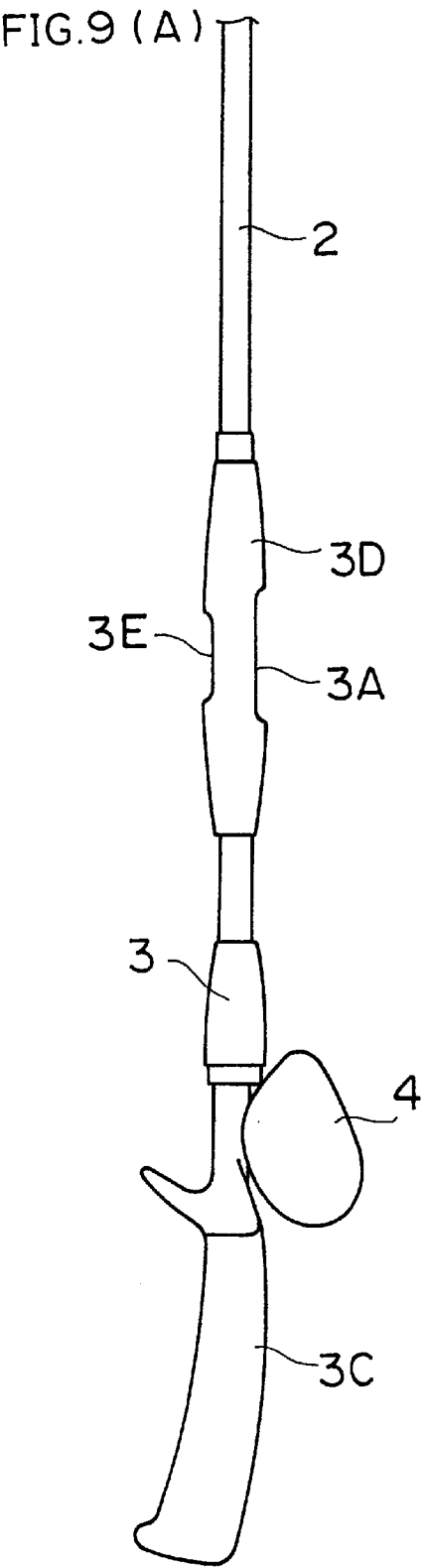
FIG. 9A is a fragmentary side elevation of the of the fishing rod depicted in FIG. 8, on a slightly reduced scale.
Figure 9B:
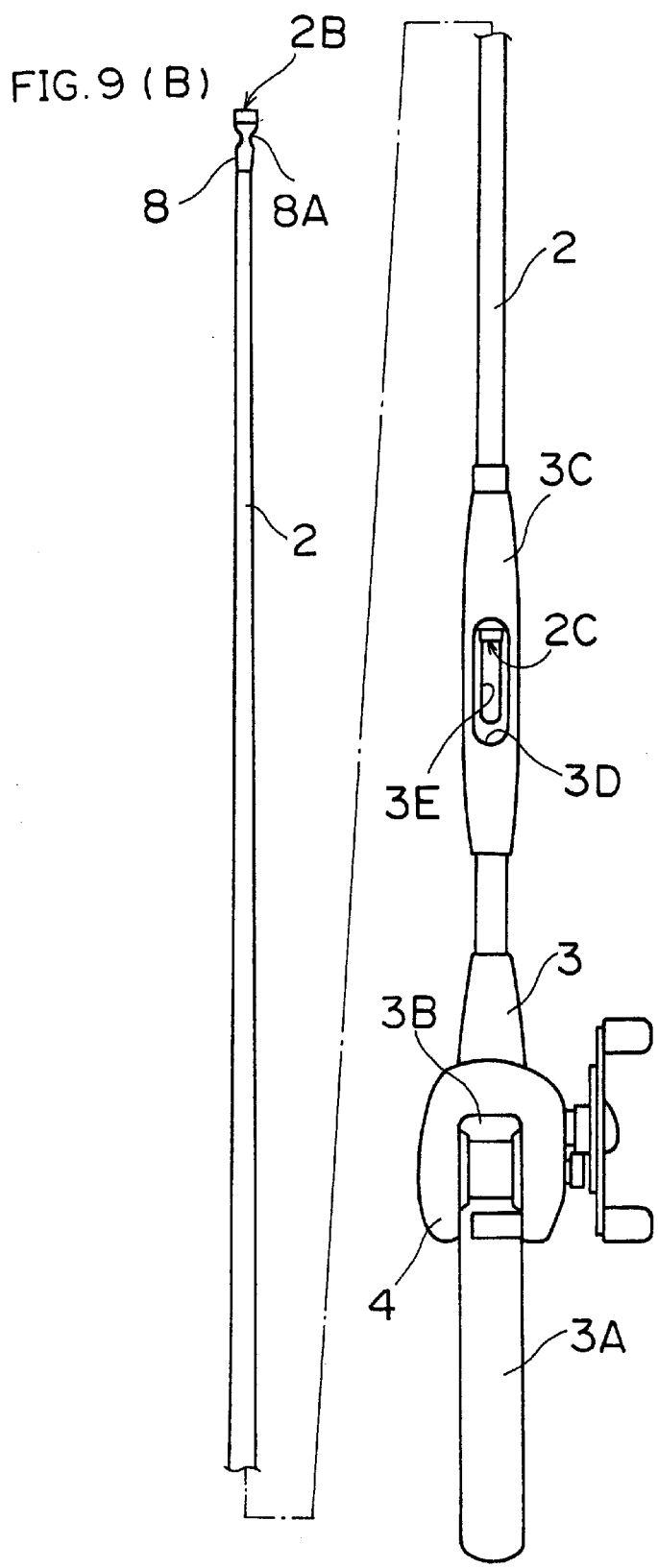
FIG. 9B is an exploded top elevation of the fish rod depicted in FIGS. 8 and 9A, on the same scale as FIG. 9.
Figure 13A:
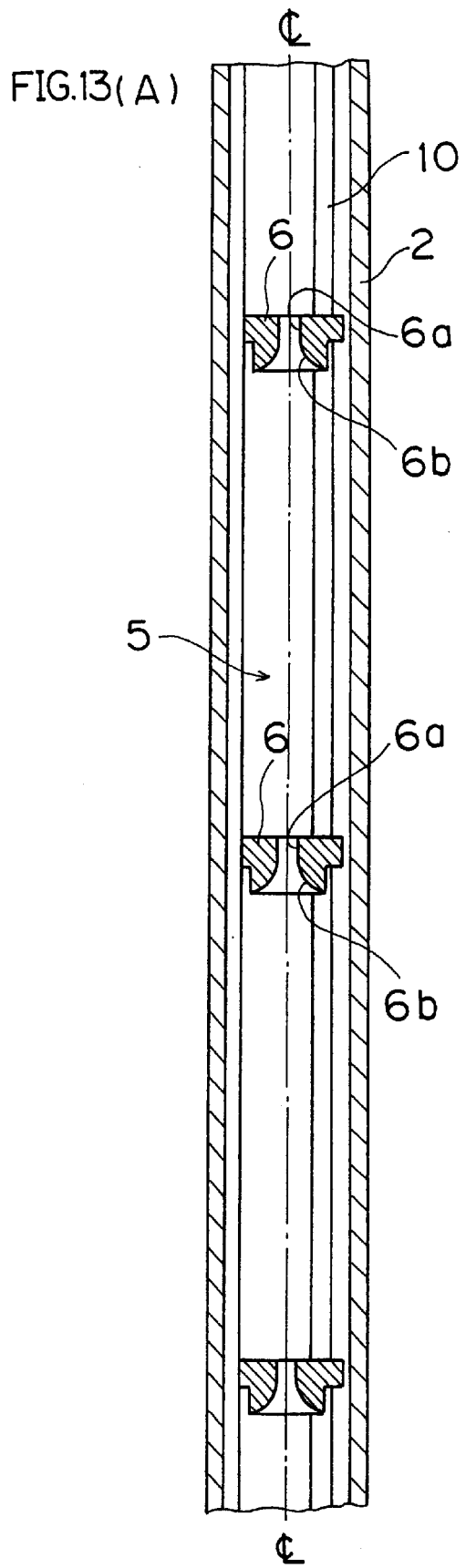
Figure 13B:
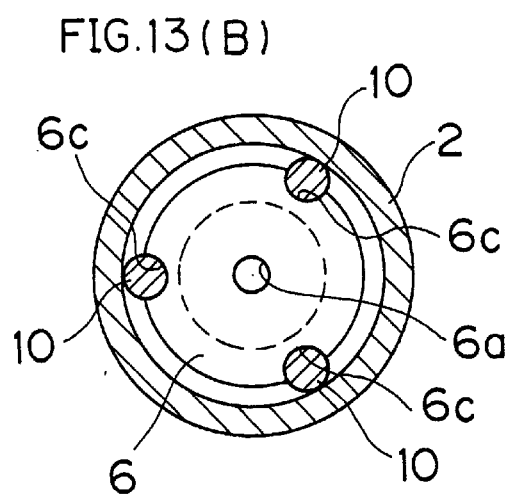
Figure 13C:
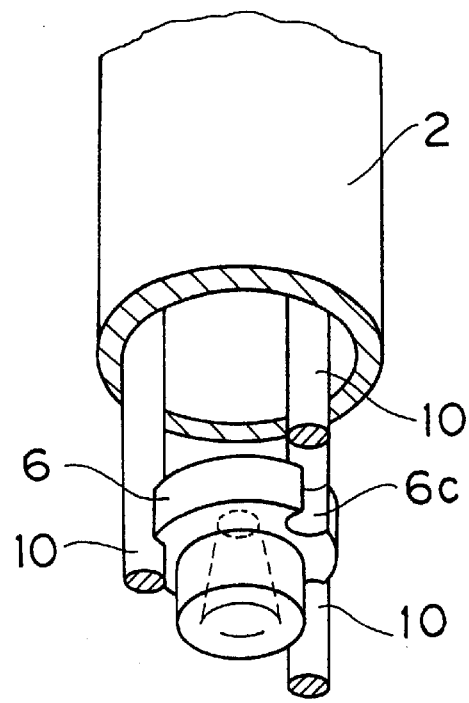

A plurality of variations of the embodiment depicted in FIGS. 8, 9A and 9B are contemplated. For instance, the inner rod 5, as shown in FIGS. 13(A), 13(B) and 13(C), includes three solid rods 10 of a small diameter with a circular cross section. The rods 10 are arranged at equal angular intervals about a center axis of the inner rod 5 so that they can contact an inner circumferential surface of the tip section 2. The plurality of fishline guides 6 are form with crescent-shaped cavities 6c which contact and hold the rods 10. The rods 10 are generally the same length as the tip section 2, and the fishline guides 6 are held by the rods 10 and arranged at given intervals in their axial direction. In this variation of the second embodiment, the assembled fishing rod 1 has a reduced weight compared with a rod with a tubular inner rod, and additionally, it can be cleaned very easily when the inner rod is taken out.

The configuration of the inner rod 5 depicted in FIGS. 13A, 13B and 13C are such that water can drain freely through the tip section 2 and drain out of the bore 3E.

It should be understood that the inner rod 5 depicted in FIGS. 13A, 13B and 13C could alternatively be formed of just two rods arranged opposite to each other thereby allowing water to flow more freely around the inner rod 5 within the fishing rod 1.

Figure 14A:
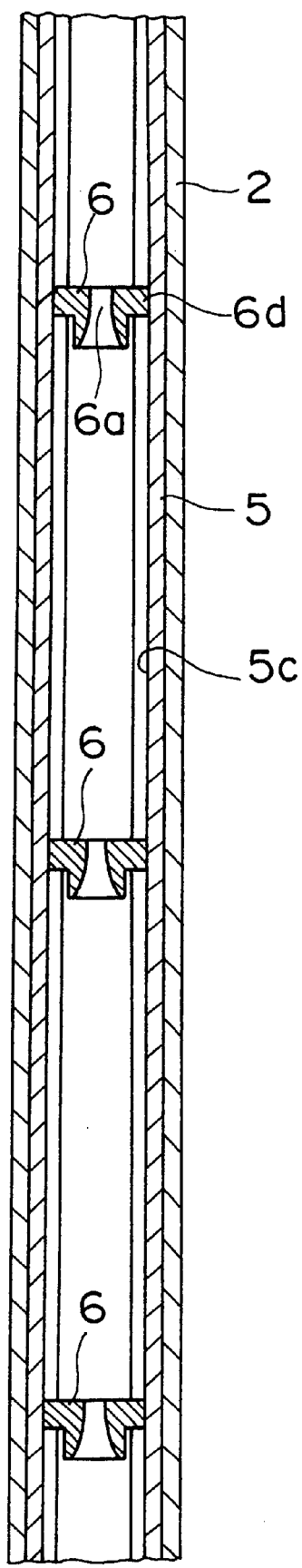
Figure 14B:
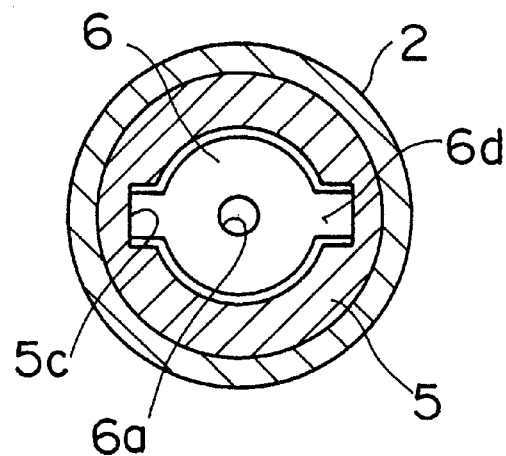
Figure 14C:
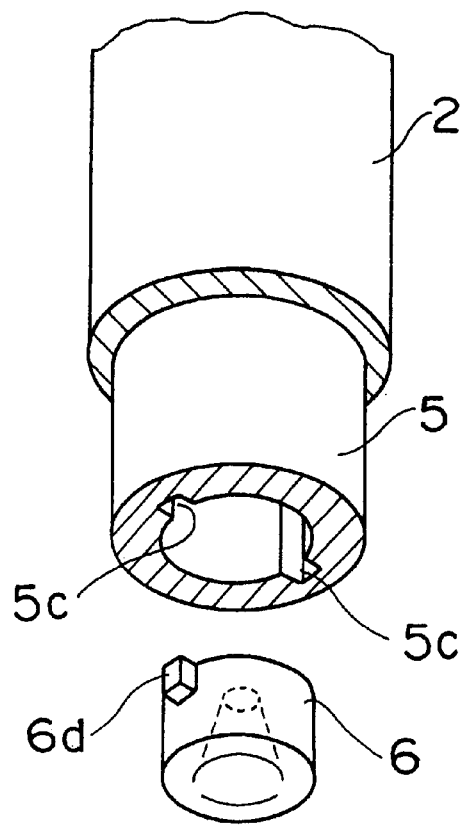

In yet another embodiment of the present invention, depicted in FIGS. 14(A), 14(B) and 14(C), the inner rod 5 has a tubular shaped. The inner rod 5 has a tubular shape and has a pair of guide grooves 5c are formed on an inner radial surface, extending axially. Each of the fishline guides 6, in this variation, is disk-shaped, and has a pair of opposing engagement projections 6d formed on its outer circumferential surface. The engagement projections 6c are respectively fitted in the guide grooves 5c of the inner rod 5. The fishline guides 6 are slid axially along the guide grooves 5c within the hollow center of the inner rod 5 in order to put the fishline guides 6 in position. The guides 6 may be held in place by a variety of means, such as glue, or heat shrinking the inner rod 5 after the guides 6 are in position or the guide grooves 5c may be partially narrowed to frictionally hold the fishline guides 6 at narrowed positions.

In yet another embodiment, as is shown in FIGS. 15(A), 15(B) and 15(C) the inner rod 5 is tube shaped. The inner surface of the tube shaped inner rod 5 is provided with fixing projections 5d made, for instance, of rubber, resin or similar elastic material. The fixing projections 5d are generally opposite one another, extending toward the center of the inner rod 5. The fishline guides 6 are disk shaped and each of them has four concavities 6e semicircular in cross section formed on the guides 6 outer radial surface. The fishline guides 6 may be inserted into the center of the inner rod 5, engaging the fixing projections 5d. The concavities 6e may have a diameter less than that of the fixing projections 5d, causing the fixing projections 5d to partially be elastically deformed to ensure a snug fit of the guides 6 within the inner rod 5.

Further, as shown in FIG. 15A, the fixing projections 5d may be formed with protruding portions 5t to assist in the retention of the guides 6 in position. The concavities 6e are larger in number than the fixing projections 5d, and the concavities 6e that do not engage the fixing projections 5d serve as drain holes for allowing the passage of water through the rod 1. The fishline guides 6 are easily fitted or detached, and the concavities 6e for engagement can be also used for guiding water in the inner rod 5 to the end opening of the inner space "b" of the tip section 2.

Figure 16A:
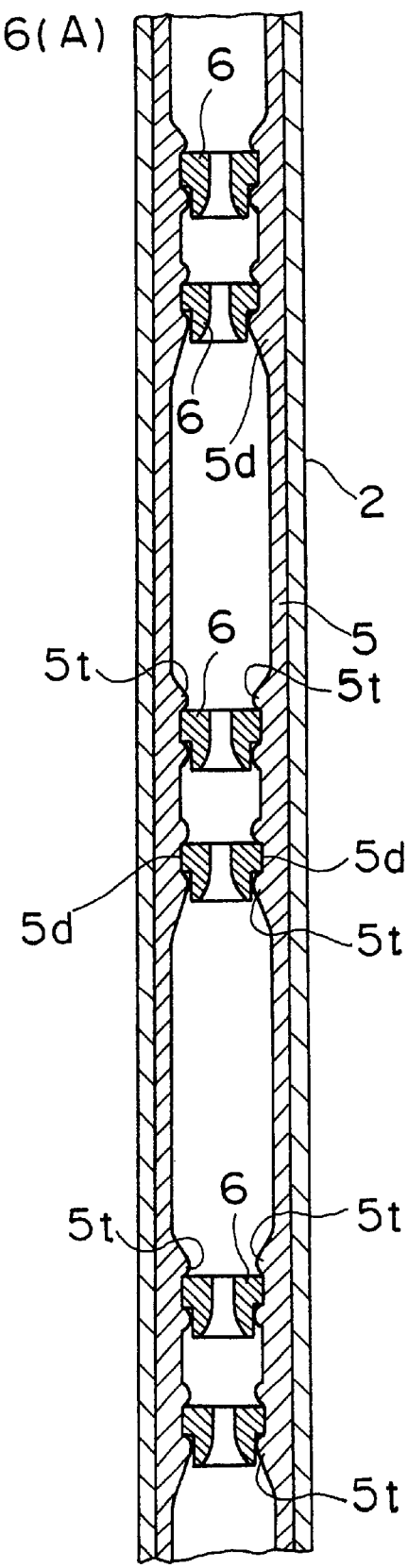
Figure 16B:
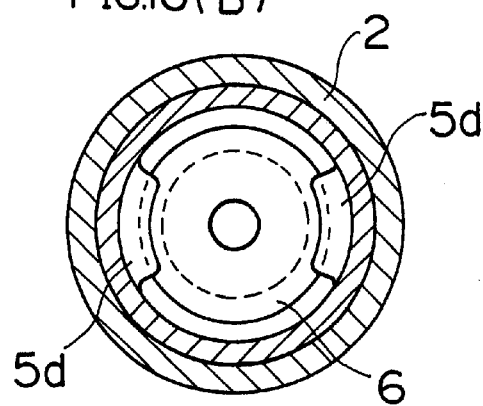
Figure 16C:
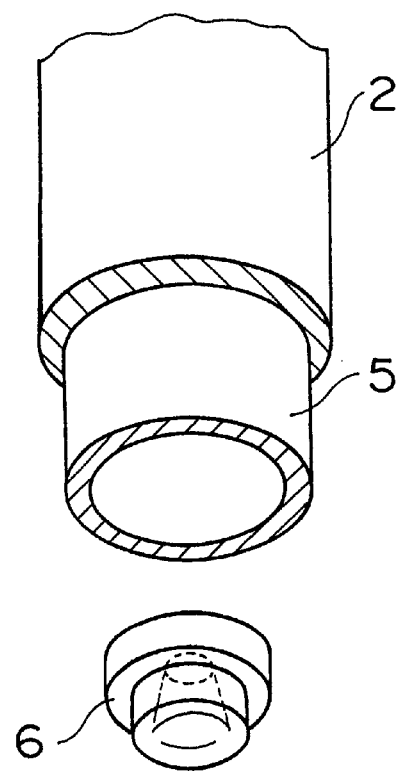

As shown in FIGS. 16(A), 16(B) and 16(C), the fixing projections 5d may have an elongated portion 5t, similar to that in FIG. 15A. As is shown in FIG. 16(A), pairs of the fishline guides 6 are attached together at one of the fixing projections 5d. Thus, although the tip section 2 is tapered, two of the fishline guides 6 attached together at one of the fixing projections 5d may have the same diameter. In this variation, there is no concavity in the outer circumference of the fishline guides.

Figure 17A:
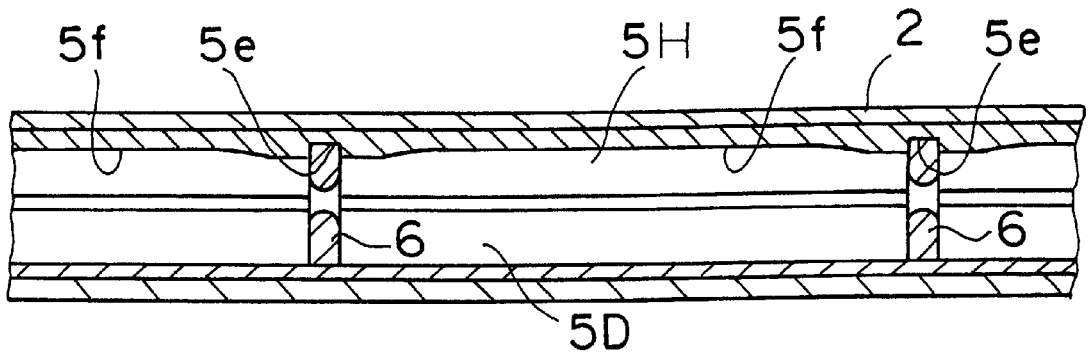
Figure 17B:
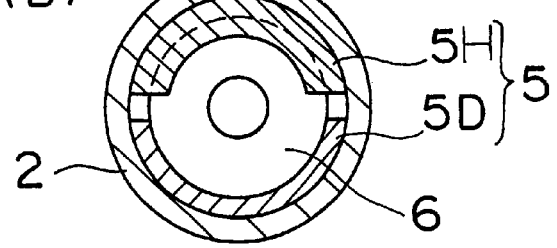

In another variation of the inner rod, as shown in FIG. 17, the inner rod 5 is divided into upper and lower sections, namely, an upper inner rod section 5H and a lower inner rod section 5D which are respectively shaped in semicircular tube. Elastically deformable engagement concavities 5e are formed within the upper inner rod section 5H, and the fishline guides 6 are ring shaped such that the guides 6 are held in the engagement concavities 5e.

Figure 18A:
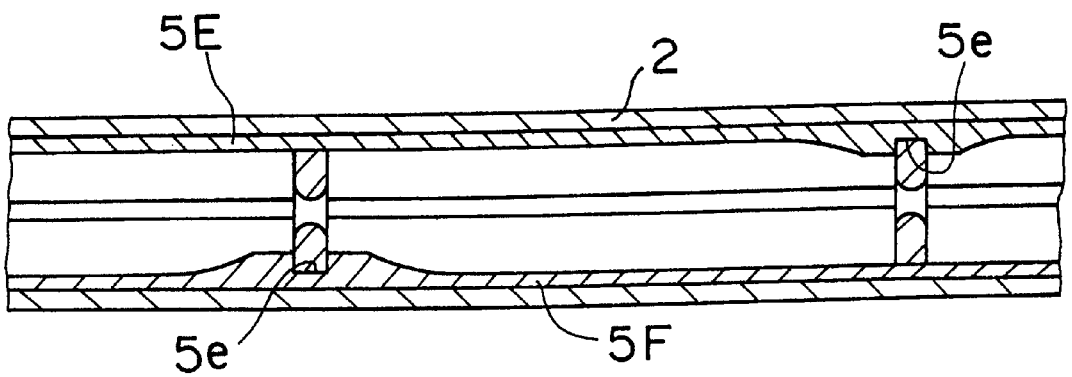
Figure 18B:
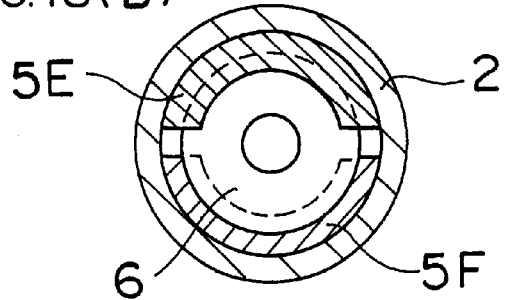

In yet another variation, as shown in FIGS. 18(A) and 18(B), the engagement concavities 5e may be alternately provided in upper and lower inner rod sections 5E and 5F spaced apart from one another so that they do not coincide with one another. The fishline guides 6 are easily fitted and detached. Since the tubular inner rod 5 is sectioned, the inner rod 5, when taken out of the rod, can be easily disassembled for cleaning.

Figure 19:
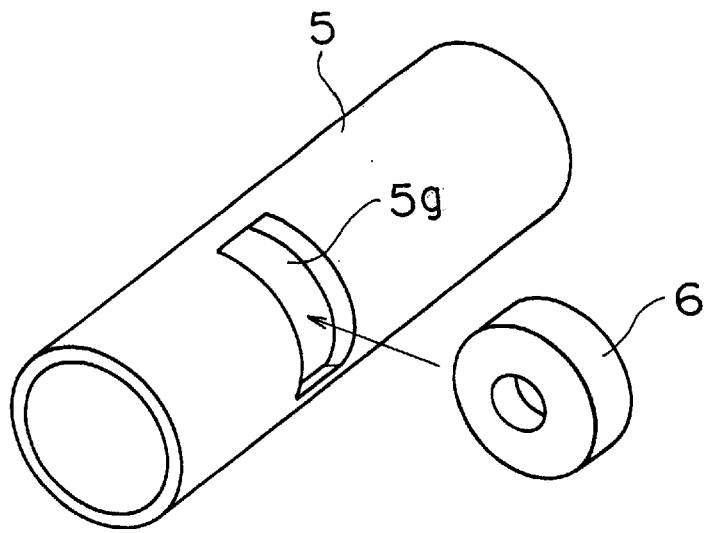
FIG. 19 and 22 are each perspective views of further inner rod embodiments for use with the fishing rod depicted in FIGS. 8, 9A, 9B and 10.

In yet another variation, as shown in FIG. 19, the inner rod 5 is shaped in tube and has an opening 5g in its wall. The disk-shaped fishline guide 6 is inserted in this opening 5g and fitted in position in the inner rod 5. At the opening 5g, short inwardly extending projections formed on the inner wall of the inner rod 5 may be formed to elastically nip and hold the fishline guide 6. Or, alternatively, the opening 5g may be slightly smaller that the guide 6, providing a forced fit to retain the guide 6. The inner rod 5 is easily fabricated as a tubular unit. The inner rod 5 with the fishline guide 6 fitted therein may be attached to the rod, and this permitting easy assembly of the rod.

Figure 20:
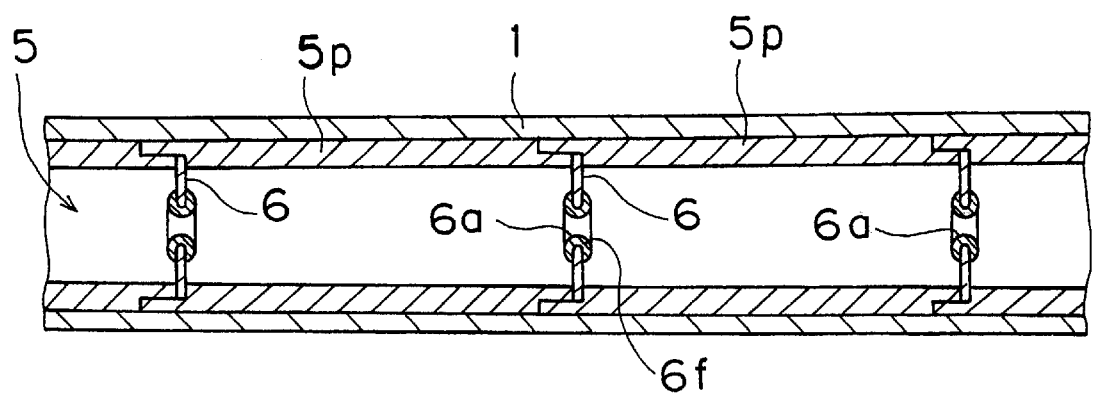

FIG. 20 illustrates still another embodiment of the present invention in which an inner rod 5 is formed from a plurality of inner rod units 5p which are fitted together to form a single inner rod 5. Each inner rod unit 5p is integrally formed with a fishline guide 6 at one end. The fishline guide 6 is, for instance, an acrylic disk plate with a ceramic ring 6f centrally secured in the fishline guide 6. The ceramic ring 6f is formed with a central opening 6a having a small diameter for guiding a fishline. Since the plurality of units of the inner rods 5p are assembled as sectional units, they do not as a whole resist bending.

Figure 21:
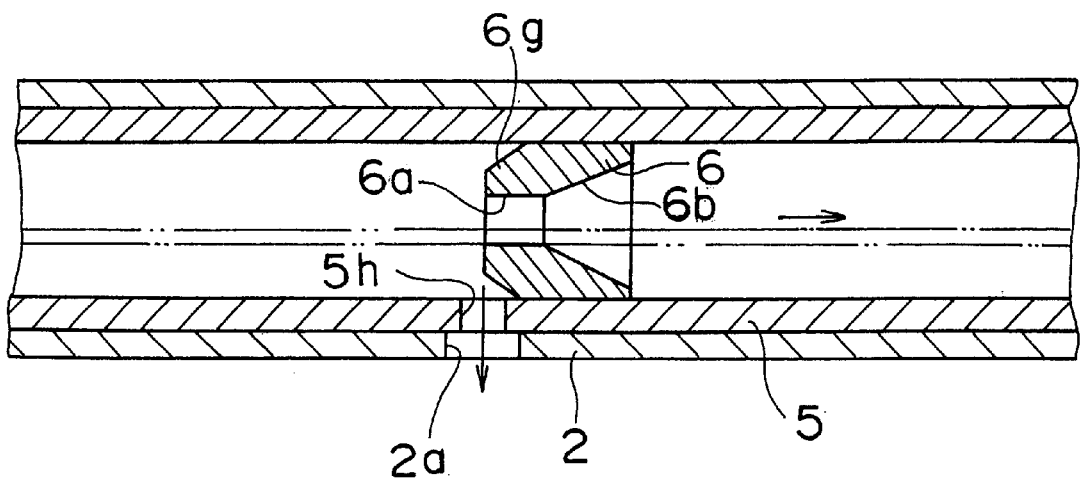

FIG. 21 depicts still another embodiment where the inner rod 5 has a tubular shape with the fishline guides 6 fixed in spaced apart positions within it. A front edge 6g of the fishline guide 6 is chamfered, and just below it in the inner rod 5, a bore 5h is formed while in a corresponding position of the tip section 2, a bore 2a is formed. The fishline guide 6 has a opening 6a and a conical surface 6b. In accordance with this embodiment, as the fishline wound up on the reel, the fishline passes through the opening 6a and the fishline contacts the guide 6. As the fishline contacts the guide 6, water and other undesirable things are scrapped off the fishline. The water and other things are expelled out through the bores 5h and 2a.

Figure 22:
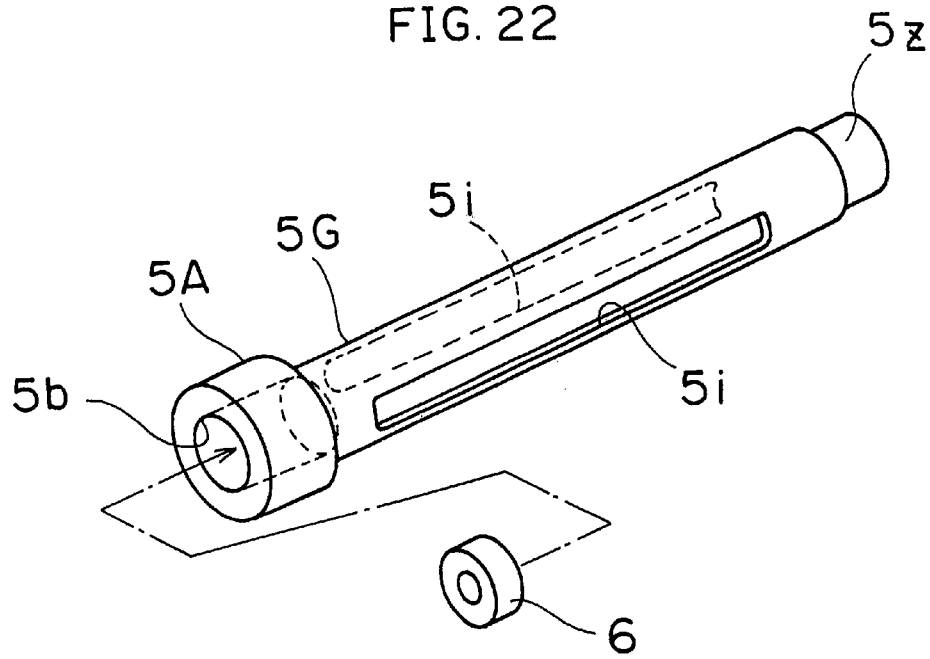

FIG. 22 illustrates a further embodiment in which the inner rod 5 consists of a tubular portion 5A and a tubular joint portion 5G extending from the tubular portion 5A. The tubular portion 5A is formed with an opening 5b into which the fishline guide 6 is fitted. The joint portion 5G has diameter that is smaller than the diameter of the tubular portion 5A. Further, the joint portion 5G is formed with a connector portion 5z having an outer diameter generally the same as the inner diameter of the opening 5b such that the connector portion 5z can be inserted into an opening 5b of the tubular portion 5A. At the joint portion 5G, elongated apertures 5i for draining water are formed opposed to each other.

Figure 23:
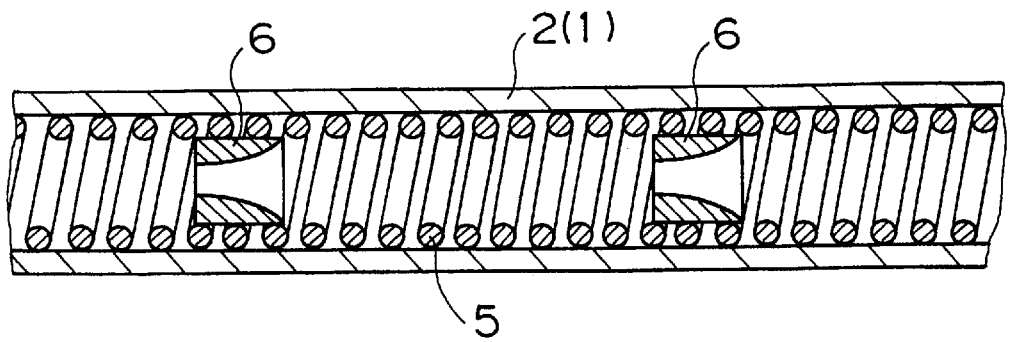

In another embodiment of the present invention, shown in FIG. 23, the inner rod 5 is formed from a helix coil spring material which has an outer diameter large enough to be in contact with the inner wall of the tip section 2. The coil spring material that defines the inner rod 5 extends generally through the entire inner length of the tip section 2. The fishline guides 6 are fitted in spaced apart position within the helix coil inner rod 5 and held in place by the coil biasing of the coil spring material.

Figure 24:
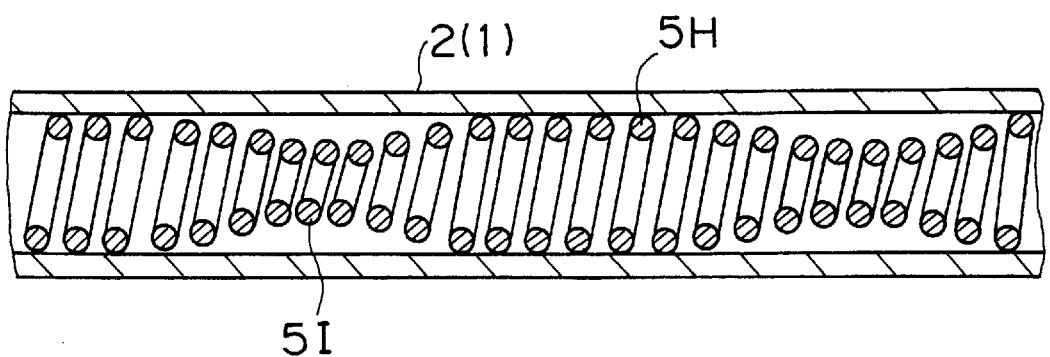

In the embodiment depicted in FIG. 24, the inner rod 5 is also made of helix coil. However, the helix coil of the inner rod 5 in FIG. 24 has a plurality of large diameter portions 5H that are in contact with the inner circumferential wall surface of the tip section 2 and a plurality of spaced apart small diameter portions 5I at the intermediate part of the tip section 2. The small-diameter portion 5I serve as fishline guides for supporting and guiding fishline. Since the helix coil alone works as the inner rod as well as the fishline guide, positions of the fishline guides in the axial direction can be determined before the coil is attached to the rod, and thus, this ensures and facilitates positioning the fishline guides in the rod. In addition to that, assembling the entire rod is easily. Moreover, when the rod bends during fishing related activities, the inner rod of the helix coil readily follows the bending movement of rod well.

Figure 25:
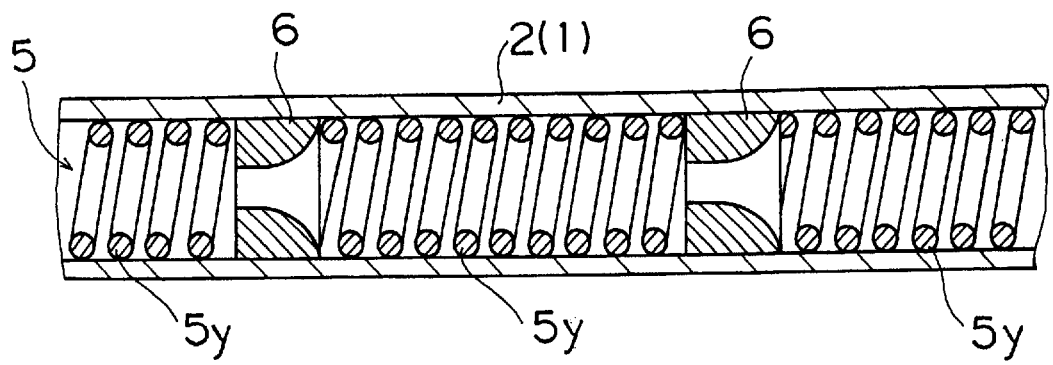

In an embodiment shown in FIG. 25, the inner rod 5 includes a plurality of helix coil members 5y with disk-shaped fishline guides 6 disposed between adjacent coil members 5y. The interval between the adjacent fishline guides 6 and coil members 5y is dependent upon the overall length of the inner rod 5, the bending properties of the rod 1 and the intended use of the rod 1.

Figure 26:
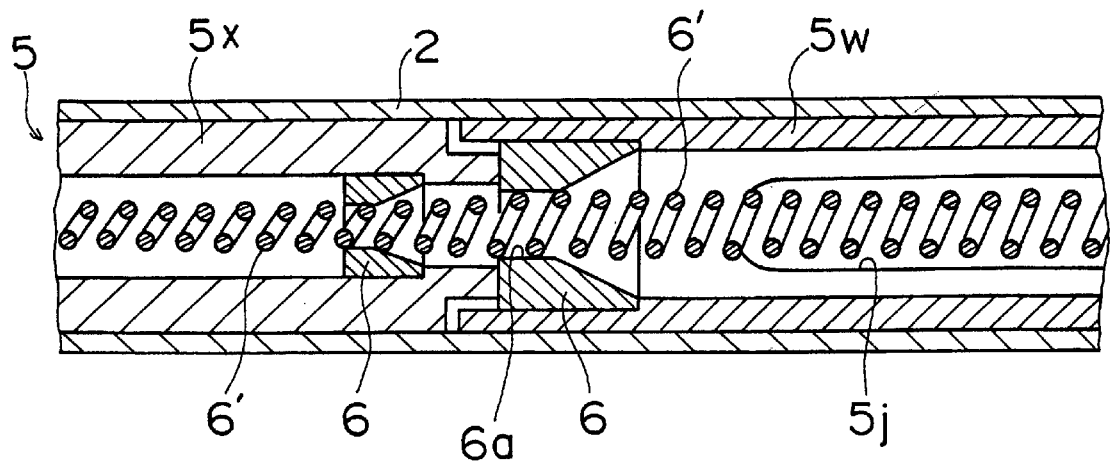

In an embodiment shown in FIG. 26, the inner rod 5 has a tubular shaped sections 5x and 5w. Each tubular shaped section includes a fishline guide 6 fitted in an inner wall surface. A helix coil 6' is put through an opening 6a formed at center of the fishline guide 6. The helix coil 6' is used for supporting a fishline. A drain hole 5j is formed in circumferential wall surface of the inner rod 5. In this embodiment, the fishline can be maintained in a generally central position within the rod.

Figure 27:
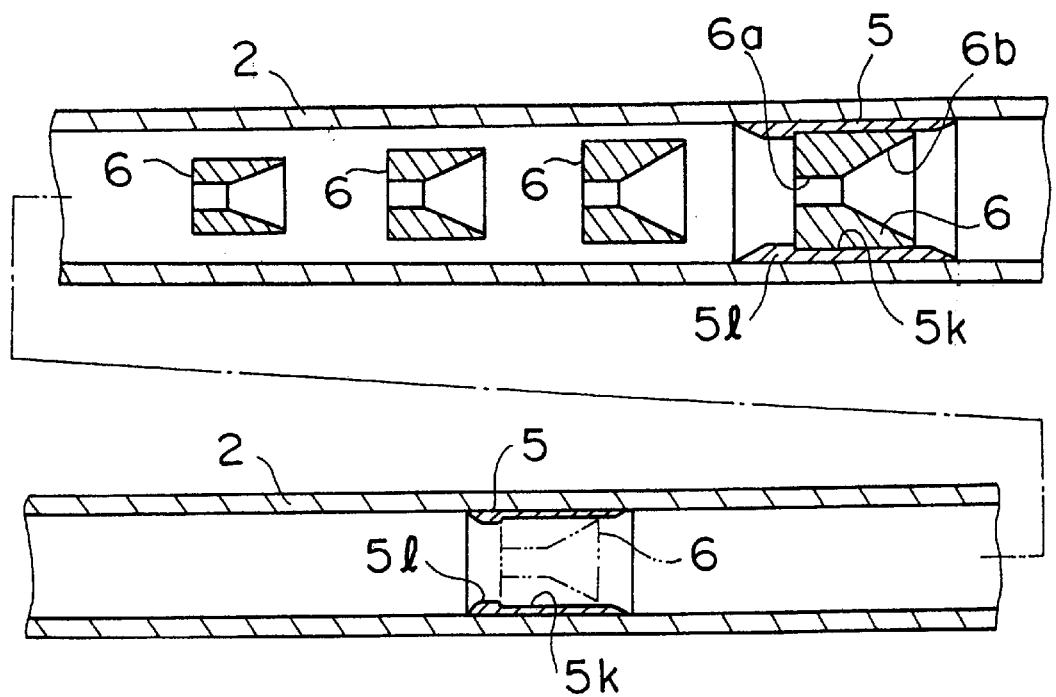

In another embodiment shown in FIG. 27, the inner rod is in the form of a plurality of tubular elements 5, and they are positioned at spaced apart intervals within the tip section 2 of the rod 1. Each of the inner rods 5 has a supporter portion 5k and a raised portion 5l thicker than the supporter portion 5k. The fishline guide 6 is movable within the rod, and may be pushed into the supporter portion 5k so as to be retained therein. Thus, applying given force to the fishline guide 6 allows the fishline guide 6 to move into the supporter portion 5k. The fishline guide 6 has an opening 6a and guide surface 6b.

Figure 28:
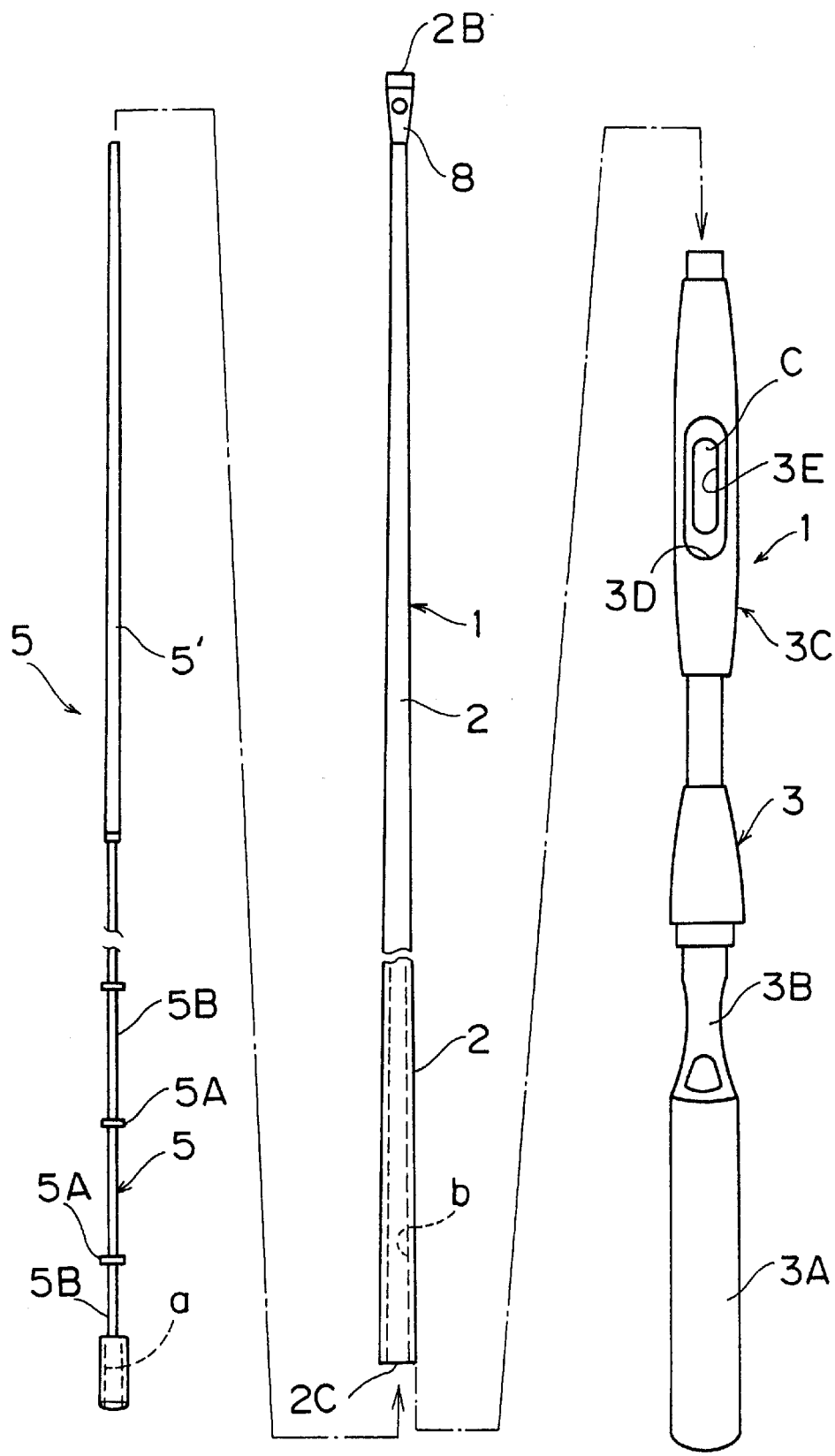
FIG. 28 is an exploded top elevation of a fishing rod and inner rod according to another embodiment of the present invention.
Figure 29:
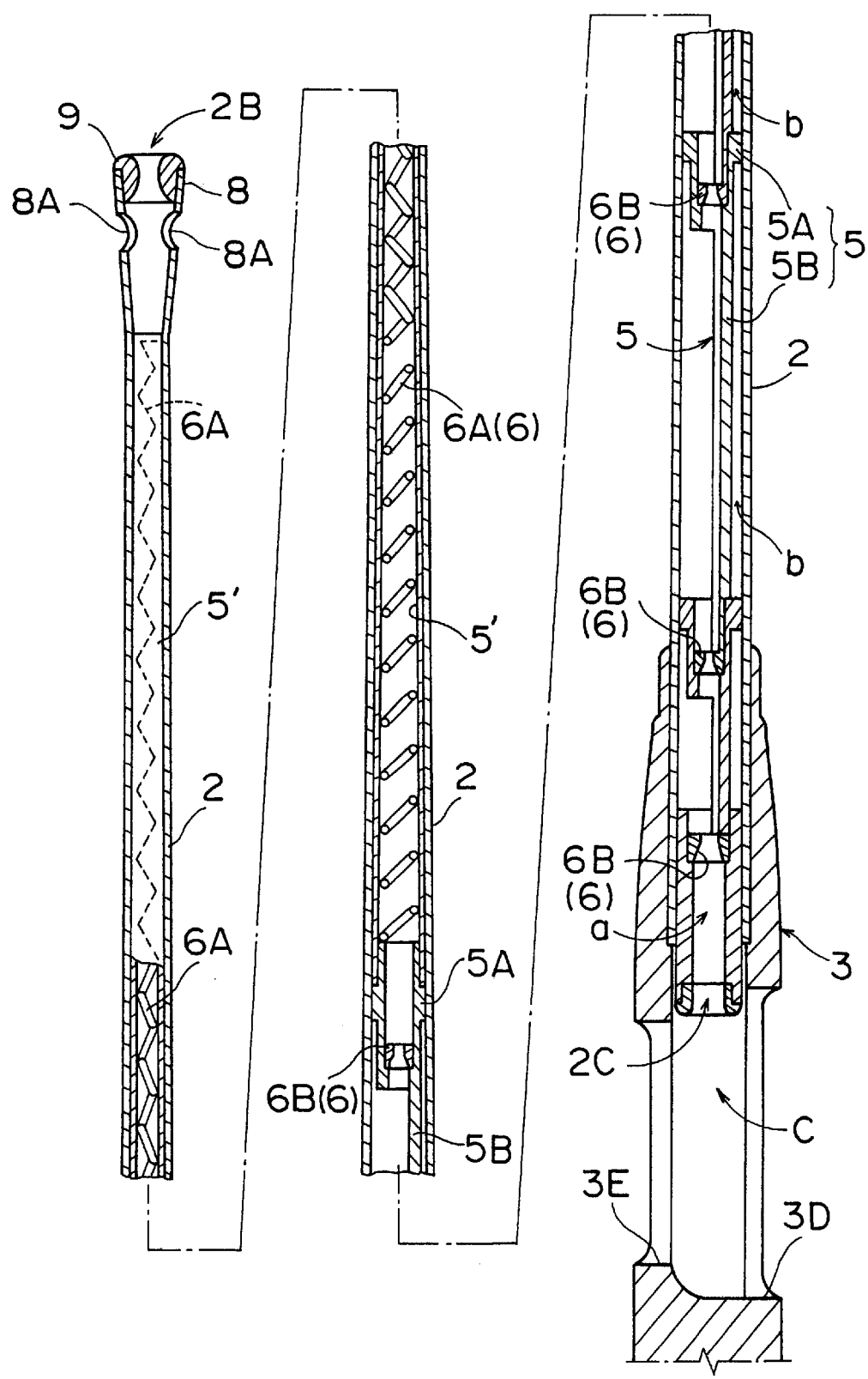
FIG. 29 is a fragmentary, exploded section of a portion of FIG. 28, on a slightly enlarged scale.

Another embodiment of a lure rod is shown in FIGS. 28 and 29. The lure rod 1 has an inner rod 5 and outer rod 2. Other components, except for the inner rod 5 and fishline guides, are generally equivalent to those described above in accordance with the embodiment depicted in FIGS. 8, 9A and 9B.

In the embodiment depicted in FIGS. 28 and 29, the inner rod 5 includes a first portion 5' made of a Teflon thermal contraction material fitted in the distal portion of the tip section 2 and a tubular portion 5A and a joint portion 5B configured similar to the corresponding elements described above with respect to FIGS. 8, 9A and 9B. Disposed within the first portion 5' is a first fishline guide 6A which is made from a helix coil. The fishline guide 6A is such that is becomes gradually smaller in diameter as it goes toward the tip of the rod section 2. In the portion 5B, a disk-shaped fishline guide 6B is fitted. The thermal contraction material used to make the portion 5' may be replaced with a fluorine or carbon pipe.

Figure 30:
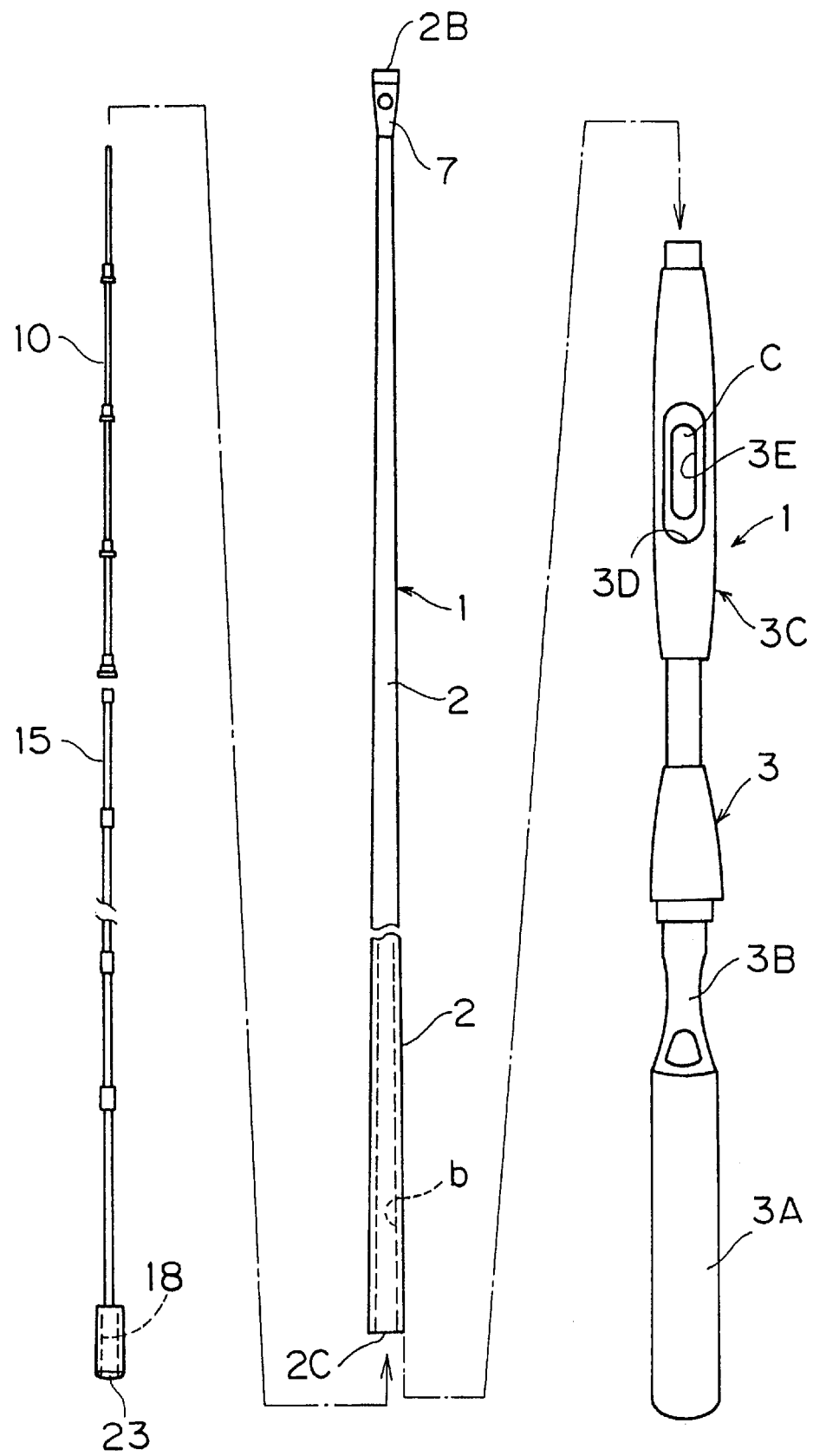
FIG. 30 is an exploded top elevation of a fishing rod and first and second inner rods in accordance with yet another embodiment of the present invention.
Figure 31:
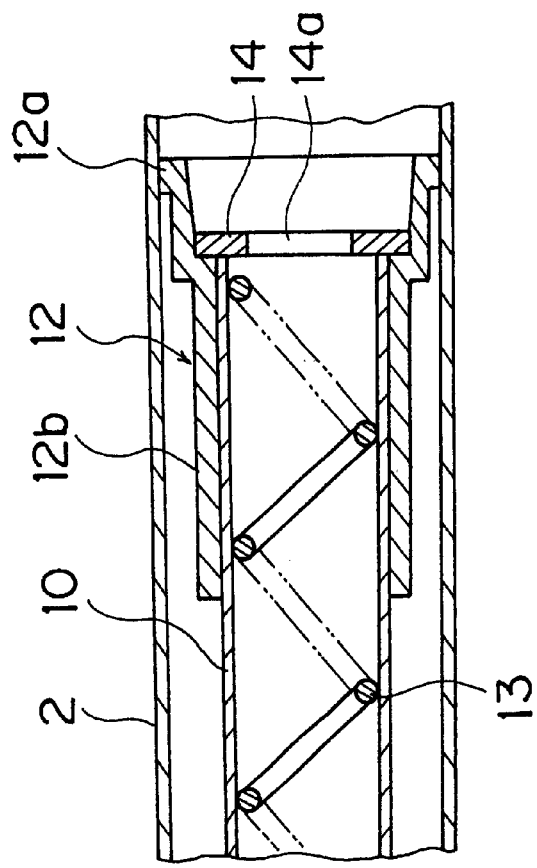
FIG. 31 is a fragmentary, section showing a portion of the first inner rod depicted in FIG. 30.
Figure 31:
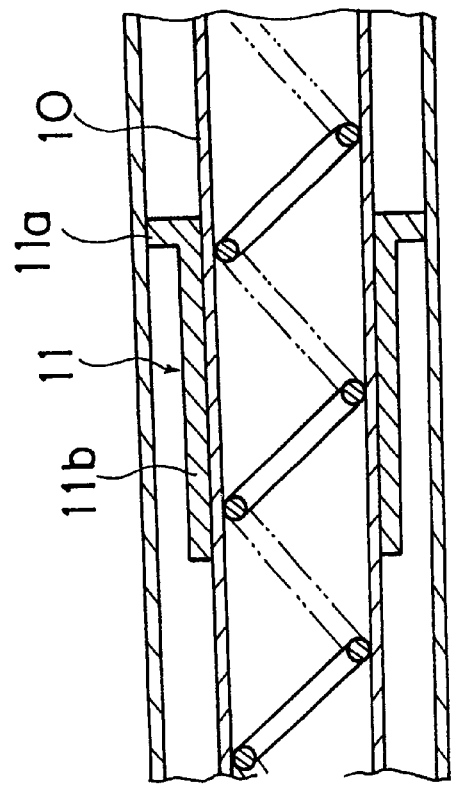

In yet another embodiment, shown in FIGS. 30 and 31, a first inner rod 10 is fitted into and detachable from the distal portion of the tip section 2. The first inner rod 10 is formed of a polyamide tube. The first inner rod 10 is centrally positioned in the tip section 2 by inner rod supporters 11 and 12 (shown in FIG. 31). The inner rod supporters 11 and 12 respectively have flanges 11a and 12a which contact an inner circumferential wall of the tip section 2 at their respective proximal ends. The inner rod supporters 11 and 12 are also formed, respectively, with tubular supporters 11b and 12b supporting the first inner rod 10 at their respective distal sections.

A gap is formed between outer circumferential wall of the first inner rod 10 and the inner circumferential wall of the tip section 2. Within the first inner rod 10, a fishline guide 13 is disposed. The fishline guide is formed of a helix coil. Further, a disk-shaped fishline guide 14 with an aperture 14a is fitted in the inner rod supporter 12 at a proximal end of the first inner rod 10. A second inner rod 15 (FIGS. 30, 32, 33 and 34) is also fitted in and detachable from the proximal portion of the tip rod section 2. The second inner rod 15 is formed of a plurality of glass fiber resin pipes 15A (see FIGS. 32 to 34).

Figure 32:
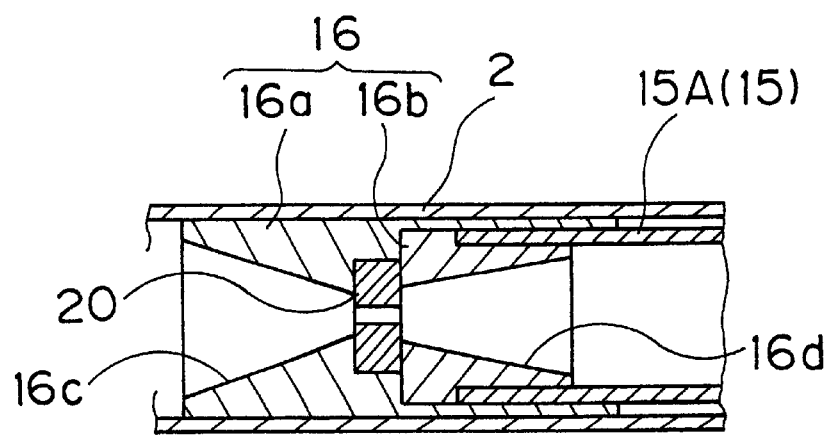
FIGS. 32 to 34 are fragmentary sections showing portions of the second inner rod depicted in FIG. 30, where
Figure 34:
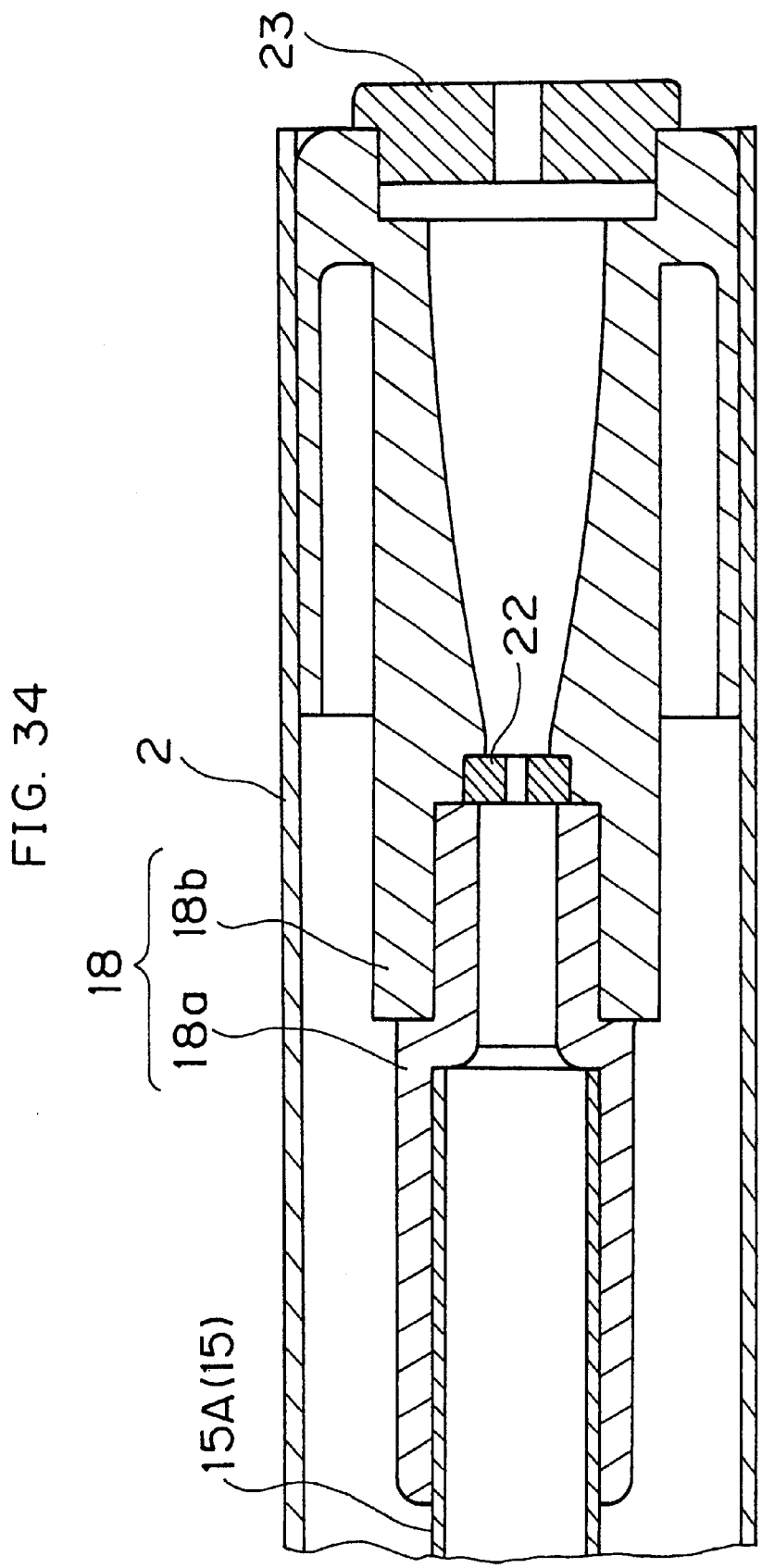
Figure 35:
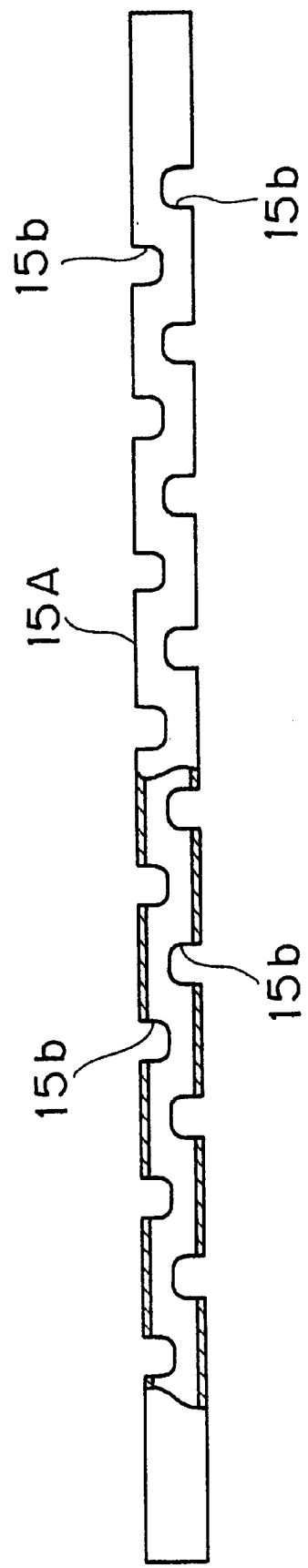
FIG. 35 is a fragmentary section showing a portion of the second inner rod depicted in FIGS. 32 through 34.

In outer circumferential wall of each pipe 15A, as shown in FIG. 35, a plurality of drain holes 15b are formed. The inner rod 15 has its tip, intermediate positions, and proximal end respectively positioned and held at axial center in the tip section 2 by inner rod supporters 16, 17 and 18 shown in FIGS. 32, 33 and 34, respectively. Adjacent pipes 15A are connected by the inner rod supporters 17. The inner rod supporter 16 is disposed at the tip of one of the inner rods 15 and has a first tubular element 16a which fits into the inner circumferential wall of the tip section 2 and a second tubular element 16b which is secured to the second inner rod 15 along with the first tubular element 16a, as shown in FIG. 32. A ring-shaped fishline guide 20 is fitted in the first tubular element 16a.

Figure 33:
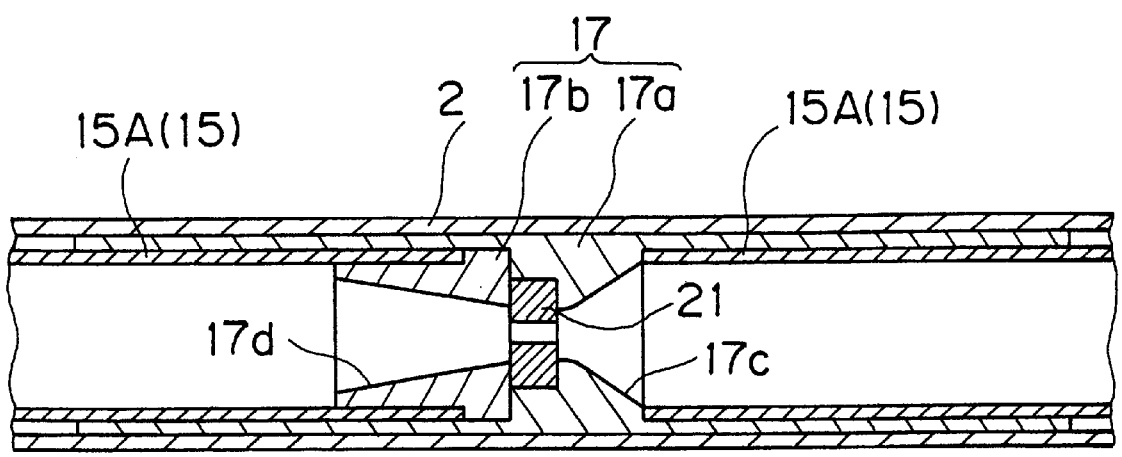

A fishline guide surface 16c, which has an inverted conical shape, is formed on the first tubular element 16a. Another fishline guide surface 16d is formed on an inner circumferential portion of the second tubular element 16b. Each of the inner rod supporters 17 at the intermediate positions has a first tubular element 17a fitted in inner circumferential wall of the tip section 2 and a second tubular element 17b fixing the fore pipe 15A with the first tubular element 17a, as shown in FIG. 33.

A ring-shaped fishline guide 21 is fitted in an inner circumferencial portion of the first tubular element 17a. Additionally, a fishline guide surface 17c is formed on an inner circumferential. Another fishline guide surface 17d is formed on an inner circumferential portion of the second tubular element 17b.

The inner rod supporter 18 at the proximal end has a first tubular element 18a supporting one of the pipes 15A and a second element 18b centrally positions and holds the first tubular element 18a within the tip section 2, as shown in an enlarged drawing of FIG. 34.

A rear end of the pipe 15A is fitted in a fore portion of the first tubular element 18a while a fore portion of the second element 18a is fitted in a rear portion of the first tubular element 18a. A ring-shaped fishline guide 22 is fitted in inner circumference of the second element 18b, and a ring-shaped fishline guide 23 is fitted in a rear inner circumference of the element 18b.

In the lure rod configured as described above, the first inner rod 10 of polyamide tube and the fishline guide 13 of helix coil are put in the distal portion of the tip section 2. This means that the distal portion of the tip section of the rod tends to follow the rod while bending. Moreover, the first and second inner rods 10 and 15 are supported by the inner rod supporters 11, 12 and 16 to 18, and there lies a gap between outer circumference of the inner rods 10 and 15 and the inner circumferential wall of the tip section 2. Thus, if the lure rod is forced to bend, the inner rods and the outer rod are not likely to touch one another, thus allowing greater flexibility when the lure rod bends.

When the lure rod is swung, the inner rods and the outer rod generally do not contact one an other because they are spaced apart from one another. In addition to that, since the holes 15b are formed in the outer circumference of the pipe 15A of the second inner rod 15, water and other undesirable things are expelled easily from the tip section 2, and the second inner rod 15, when taken out, can be easily cleaned.

In forming the fishline guide and the inner rod in unity, they may be shaped in bellows. If an element shaped in bellows is employed, inner projections of the bellows work as fishline guides. The substance made into bellows is generally highly elastic, and therefore, the bellows tend to follow the lure rod on bending.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. An internal-line tapered fishing rod comprising:
   a tapered tip section having a bore and a fishing-line entrance hole communicating with the bore;
   a butt section connectable to said tapered tip section endwise adjacent said fishing-line entrance hole;
   an inner guide assembly formed base-endwise with a flange having a removal hole perpendicular to the fishing rod axis, said inner guide assembly defining an internal fishing line passage and including axially tapered fishing-line guide means circumferentially retained and coaxially disposed within said inner guide assembly, said fishing-line guide means therein following the taper of said tapered tip section such that said inner guide assembly is adapted for removable insertion into said tip section; wherein
      the removal hole in said flange is aligned with said fishing-line entrance hole such that the inner guide assembly can be removed, and
      the removal hole is for receiving a removal tool for pulling said inner guide assembly out of said tip tapered section.

2. The fishing rod as set forth in claim 1, wherein said inner guide assembly is perforated by a plurality of peripheral bores, wherein said tapered tip section is not correspondingly perforated.

3. The fishing rod as set forth in claim 1, wherein said fishing-line guide means comprises helical coils.

4. The fishing rod as set forth in claim 1, wherein said tapered tip section base-endwise is formed with an axially extending bulge wherein said fishing-line entrance hole is formed.

5. The fishing rod as set forth in claim 1, wherein said fishing-line guide means are removable from said inner guide assembly.

6. The fishing rod as set forth in claim 1, wherein said fishing-line guide means and said inner guide assembly are integrally formed.

7. The fishing rod as set forth in claim 1, wherein said fishing-line guide means are spaced apart at lengthwise intervals in said inner guide assembly.

8. The fishing rod according to claim 1, wherein said inner guide assembly comprises a plurality of sections, and one of each of said fishing-line guide means is disposed between adjacent sections of said inner guide assembly.

9. The fishing rod according to claim 1, wherein said inner guide assembly comprises a plurality of inner guide sections joined by a plurality of annular joints constituting said fishing-line guide means.

10. The fishing rod as set forth in claim 9, wherein each of said annular joints is formed with a central aperture configured to receive distally one of said inner guide sections.

11. The fishing rod as set forth in claim 9, wherein said annular joints are inner-circumferentially contiguous with said tapered tip section wherein said inner guide assembly is inserted into said tapered tip section.

\* \* \* \* \*